(12) United States Patent
Ruic

(10) Patent No.: US 12,554,914 B2
(45) Date of Patent: Feb. 17, 2026

(54) INTEGRATED CIRCUIT INTERCONNECT SHAPE OPTIMIZER

(71) Applicant: GDM Holding LLC, Mountain View, CA (US)

(72) Inventor: Dino Ruic, Santa Clara, CA (US)

(73) Assignee: GDM HOLDING LLC, Mountain View, CA (US)

( * ) Notice: Subject to any disclaimer, the term of this patent is extended or adjusted under 35 U.S.C. 154(b) by 342 days.

(21) Appl. No.: 18/105,737

(22) Filed: Feb. 3, 2023

(65) Prior Publication Data

US 2023/0297756 A1 Sep. 21, 2023

Related U.S. Application Data

(60) Provisional application No. 63/310,750, filed on Feb. 16, 2022.

(51) Int. Cl.
*G06F 30/394* (2020.01)
*G06F 30/398* (2020.01)
*G06F 119/06* (2020.01)

(52) U.S. Cl.
CPC .......... *G06F 30/394* (2020.01); *G06F 30/398* (2020.01); *G06F 2119/06* (2020.01)

(58) Field of Classification Search
CPC ........ G06F 21/44; G06F 30/20; G06F 30/392; G06F 30/398; G06F 2119/18;
(Continued)

(56) References Cited

U.S. PATENT DOCUMENTS 6,536,027 B1 3/2003 Grinchuk et al.
6,711,727 B1 3/2004 Teig et al.
(Continued)

FOREIGN PATENT DOCUMENTS

CN 105447222 A 3/2016
CN 113312871 A 8/2021
(Continued)

OTHER PUBLICATIONS

The First Office Action for Chinese Patent Application No. 202380020703.8, Feb. 22, 2025, 8 Pages.
(Continued)

*Primary Examiner* — Binh C Tat
(74) *Attorney, Agent, or Firm* — Botos Churchill IP Law LLP

(57) ABSTRACT

Systems, devices, and methods for optimization of conducting interconnects are described. A method includes receiving an integrated circuit layout including a plurality of terminals and an interconnect, wherein the interconnect represents a conductive coupling between the plurality of terminals. The method includes receiving terminal information describing operating parameters of the plurality of terminals. The method includes receiving layer information describing material composition and material property information for the plurality of terminals and the interconnect. The method includes generating a three-dimensional representation of an integrated circuit using the integrated circuit layout and the layer information. The method includes determining an individual contribution of a cell included in the three-dimensional representation to a resistance-capacitance (RC) value of the interconnect using the three-dimensional representation and the terminal information. The method also includes generating an updated integrated circuit layout based at least in part on the individual contribution.

20 Claims, 12 Drawing Sheets

(58) Field of Classification Search
CPC .. G06F 2119/06; G06F 30/327; G06F 30/367;
G06F 30/00; G06F 30/23; G06F 30/30;
G06F 30/31; G06F 30/3308; G06F 30/39;
G06F 30/394; G03F 9/7084; H01L
2224/73265; H01L 23/5283; H01L
2924/15311; H01L 2224/48227; H01L
2225/06544; H01L 23/49838; H01L
23/528; H01L 23/5386; H01L 23/5225
USPC .................................................. 716/100–106
See application file for complete search history.

(56) References Cited

U.S. PATENT DOCUMENTS

| | | | |
|---|---|---|---|
| 6,957,411 | B1 | 10/2005 | Teig et al. |
| 7,506,289 | B1 | 3/2009 | Chapman |
| 7,506,295 | B1 | 3/2009 | Teig |
| 7,823,113 | B1 | 10/2010 | Waller et al. |
| 8,332,805 | B1 | 12/2012 | Birch et al. |
| 8,949,760 | B2 | 2/2015 | Birch et al. |
| 9,342,647 | B2 | 5/2016 | Chen et al. |
| 9,846,756 | B2 | 12/2017 | Pan et al. |
| 10,706,200 | B2 | 7/2020 | Sha et al. |
| 10,755,026 | B1 | 8/2020 | Luo |
| 10,860,768 | B1 | 12/2020 | Kourkoulos et al. |
| 10,943,049 | B2 | 3/2021 | Chuang et al. |
| 11,031,275 | B2 * | 6/2021 | Or-Bach ............... H10D 30/43 |
| 12,131,108 | B2 | 10/2024 | Yu et al. |
| 2001/0053948 | A1 | 12/2001 | Kishida et al. |
| 2008/0244489 | A1 | 10/2008 | Tanamoto et al. |
| 2013/0191798 | A1 | 7/2013 | Nieuwoudt et al. |
| 2017/0032074 | A1 | 2/2017 | Song et al. |
| 2017/0344692 | A1 | 11/2017 | Oh et al. |
| 2018/0239857 | A1 | 8/2018 | Qin et al. |
| 2018/0314783 | A1 * | 11/2018 | Moroz ................. G06F 30/367 |
| 2019/0319044 | A1 * | 10/2019 | Harari ................... H10B 43/10 |
| 2020/0184136 | A1 | 6/2020 | Moroz |
| 2021/0303765 | A1 | 9/2021 | Chen et al. |

FOREIGN PATENT DOCUMENTS

| | | |
|---|---|---|
| CN | 113366635 A | 9/2021 |
| JP | H1032254 A | 2/1998 |
| JP | 2000228447 A | 8/2000 |
| JP | 2000236023 A | 8/2000 |
| JP | 2008243993 A | 10/2008 |
| KR | 20080087714 A | 10/2008 |
| KR | 101679920 B1 | 11/2016 |
| KR | 20170015835 A | 2/2017 |
| KR | 20170133750 A | 12/2017 |
| WO | 2020144568 A1 | 7/2020 |

OTHER PUBLICATIONS

International Search Report and Written Opinion, mailed May 24, 2023, in corresponding International Patent Application No. PCT/US2023/012601, filed Feb. 8, 2023, 8 pages.

Cheng et al., RePlAce: Advancing Solution Quality and Routability Validation in Global Placement, IEEE Xplore Digital Library, http://ieeexplore.ieee.org/Xplore, IEEE Transactions on Computer-Aided Design of Integrated Circuits and Systems, 2019, 15 pages.

Cong et al., Incremental Physical Design, Proceedings of the 2000 international symposium on Physical design, 2000, 9 pages.

Cong et al., MARS—A Multilevel Full-Chip Gridless Routing System, IEEE Transactions on Computer-Aided Design of Integrated Circuits and Systems, vol. 24, No. 3., Mar. 2005, 13 pages.

Chen et al., Global and detailed routing, Electronic Design Automation, Morgan Kaufmann, 2009, 64 pages.

Francisco et al., Design Rule Checking with a CNN Based Feature Extractor, 2020 ACM/IEEE 2nd Workshop on Machine Learning for CAD (MLCAD), IEEE, 2020, 6 pages.

Francisco, Machine Learning for Design Rule Checking, Multilayer CMP Hotspot Detection, and PPA Modeling, with Transfer Learning and Synthetic Training, North Carolina State University, 2021, 166 pages.

Kang, Floorplan Representation, Global Placement, and Routability Analysis for VLSI Layout Design Automation, California Digital Library, University of California, 2018, 156 pages.

Knechtel et al., Physical Design Automation for 3D Chip Stacks—Challenges Solutions, Proceedings of the 2016 on International Symposium on Physical Design, 2016, 8 pages.

McMurchie et al., Pathfinder: A Negotiation-based performance-driven router for FPGAs, Proceedings of the 1995 ACM third international symposium on Field-programmable gate arrays, 1995, 7 pages.

Mondal et al., Rectilinear routing algorithm for crosstalk minimisation in 2D and 3D IC, IET Computers & Digital Techniques 14.6, 2020, 7 pages.

Shi et al., A fast hierarchical algorithm for three-dimensional capacitance extraction, IEEE Transactions on Computer-Aided Design of Integrated Circuits and Systems 21.3 (2002), 7 pages.

Tabrizi et al., Eh?Predictor: A Deep Learning Framework to Identify Detailed Routing Short Violations from a Placed Netlist, IEEE Transactions on Computer-Aided Design of Integrated Circuits and Systems, vol. 39, No. 6, 2020, 14 pages.

Wang et al., VoxCap: FFT-Accelerated and Tucker-Enhanced Capacitance Extraction Simulator for Voxelized Structures, IEEE Transactions on Microwave Theory and Techniques 68.12, 2020, 15 pages.

Office Action issued in corresponding Korean Patent Application No. 10-2024-7024610, mailed Oct. 22, 2024, 12 pages.

Notice of Allowance for Japanese Patent Application No. 2024-548444, Feb. 18, 2025, 5 Pages.

The Extended European Search Report for European Patent Application No. 2376775.5, Nov. 17, 2025, 10 Pages.

Alioto, "CAD Models of the Input Admittance of RC Wires: Comparison and Selection Strategies," International Conference on Microelectronics, 2008, XP031615467, ISBN: 978-1-4244-2369-9, pp. 179-182.

Chou, et al., "Efficient Formultaion and Model-Order Reduction for the Transient Simulation of Three-Dimensional VLSI Interconnect", IEEE Transactions on Computer-Aided Design of Integrated Circuits and Systems, IEEE, USA, vol. 16, No. 12, 1997, XP011007511, ISSN: 0278-0070, pp. 1454-1476.

* cited by examiner

INTEGRATED CIRCUIT INTERCONNECT SHAPE OPTIMIZER

CROSS-REFERENCE TO RELATED APPLICATION

This application claims the benefit of U.S. Provisional Application No. 63/310,750, filed Feb. 16, 2022, which is hereby incorporated by reference in its entirety.

TECHNICAL FIELD

This disclosure relates generally to integrated circuits, and in particular but not exclusively, relates to first principles electronic design automation for integrated circuit shape optimization and layout generation.

BACKGROUND INFORMATION

Routing is a fundamental problem in electronic design and automation, which generates wiring to interconnect pins of a common signal while obeying manufacturing design rules. For very large-scale integrated circuit designs, in which there may be billions of transistors in a single chip, routing optimization is particularly challenging due to the complexity of the integrated circuit. Typically, routing is separated into at least a global routing stage and a detailed routing stage, in which global routing plans generate routing paths without considering the manufacturing design rules of a given vendor process node and detailed routing determines the exact route.

Conventional routing algorithms may be generated using a multi-dimensional grid-based graph-search technique (e.g., two-dimensional grids with a third dimension corresponding to routing layers), where routing resources are modeled as a graph in which the graph topology can represent the integrated circuit structure. Global routing can then partition the graph into tiles and find tile-to-tile paths to guide the detailed router. The detailed router then superimposes a grid, in which each unit of the grid is larger than or equal to the sum of the minimum width and spacing of wires for the given vendor process node, on the graph to find the exact wiring route. Typical routers generate detailed routes sequentially and have preferred routing directions (i.e., metal wires arranged in horizontal or vertical directions for different metallization layers of the integrated circuit) and thus may be limited in both efficiency and geometry (e.g., limited to Manhattan routing conventions of vertical and horizontal straight lines).

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1:
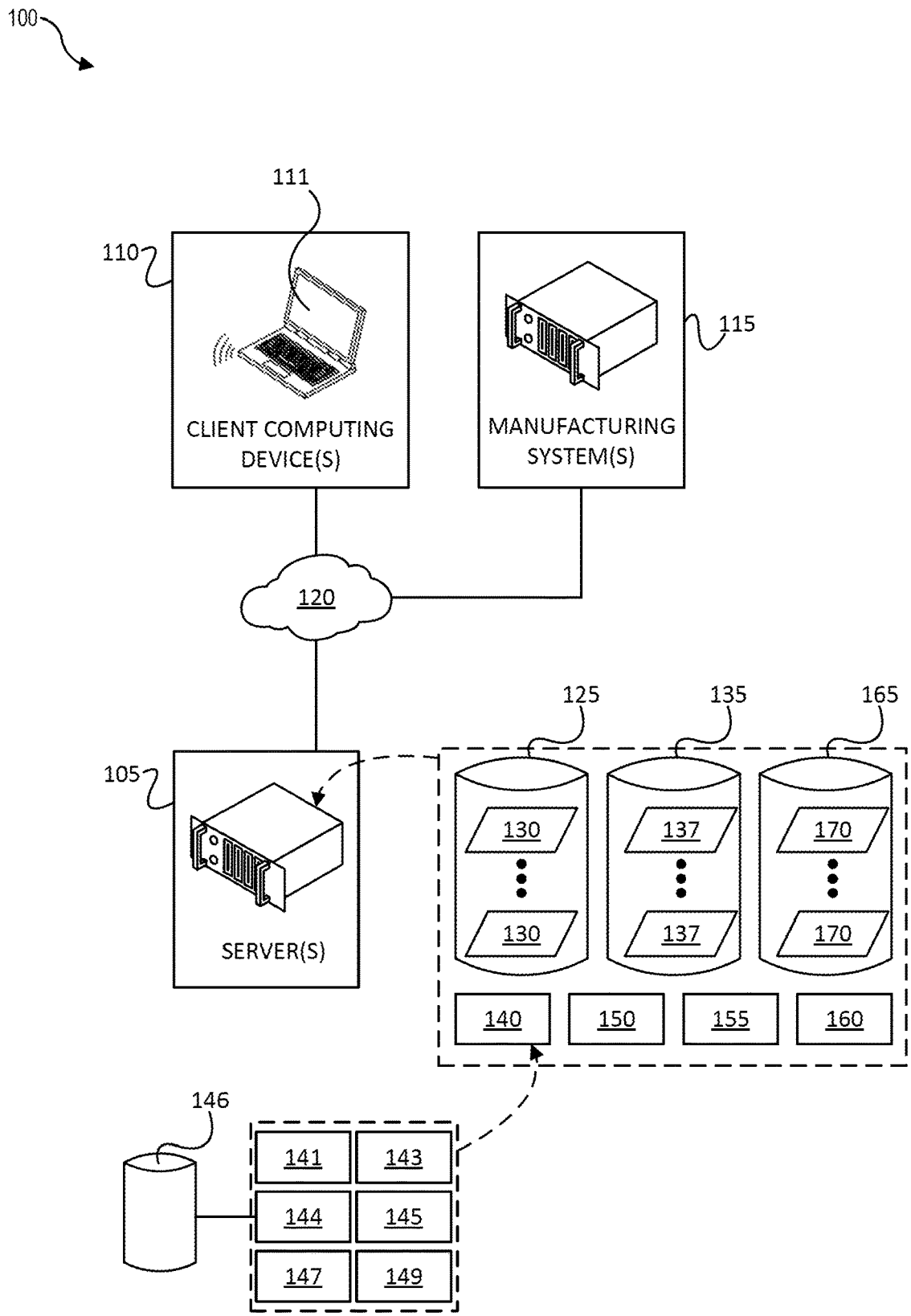
FIG. 1 is a schematic diagram of an example system for modifying conducting interconnects in an integrated circuit layout, in accordance with embodiments of the present disclosure.

Embodiments of a system and method for cell-based detailed interconnect routing based on RC simulation are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Most fundamental properties of an integrated circuit are related to resistances and capacitances. The delay in charging and discharging elements of the integrated circuit every clock-cycle is directly given by the RC time constant. The capacitance is related to the amount of charge flowing in and out of the circuit and so the current can be derived and then the power necessary to drive the integrated circuit follows. Moreover, Joule heat generated during operation follows immediately from the resistance and current as well. As a result of increasing miniaturization, phenomena like electromigration and dielectric breakdown have impacted the reliability of integrated circuits, which are also related to the field strengths in the conductor (e.g., metals such as Au, Ag, Al, Cu, Ti, a combination thereof to form a metal alloy) and in between conductors (e.g., oxides such as $SiO_2$, $SiO_x$, or other insulators).

Described herein are embodiments of an iterative cell-based integrated circuit (IC) optimizer implementing first principles techniques to modify detailed interconnect shapes in integrated circuit layouts. In this context, an integrated circuit layout describes a graphical and/or numerical representation of at least a portion of an integrated circuit, such as a layer of an integrated circuit, that includes one or more interconnects between one or more terminals. In this context, a terminal is a contact coupled with an IC element, which is also referred to as a port, and an interconnect is a conductive material that electrically couples two or more terminals. Interconnects are also referred to as "nets" or "wires" in line with a term of art employed in the field of IC layout routing.

An integrated circuit layout can describe positions and dimensions of multiple interconnects and multiple types of terminals. For example, an interconnect can electrically couple multiple input terminals to a single output terminal (referred to as a "fan in" configuration). In another example, an interconnect can electrically couple a single input terminal to multiple output terminals (referred to as a "fan out" configuration). In yet another example, an interconnect can electrically couple multiple input terminals to multiple output terminals (referred to as a "fan-in-out" configuration). In some embodiments, interconnects electrically couple one or more drivers to one or more loads, for example, as part of powering one or more transistors.

Analytical solutions for the RC value of an interconnect that incorporate physically meaningful terms are effectively unavailable at the dimensions and geometries employed in IC layouts. For that reason, finite-volume, finite-element, or other types of 3D full-field numerical simulation methods can be used to determine the RC value. Specifically, a three-dimensional representation of an IC layout can be generated to discretize a layout into an array of volumetric elements, referred to as cells or as voxels. A cell is characterized by uniform material properties corresponding to a position of the cell in the IC layout. As an example, a cell at a position of an interconnect in an IC layout can be defined as a conductor (e.g., a metal). In another example, a cell at a position outside an interconnect can be defined as a dielectric or insulator (e.g., an oxide). The materials can include those that are used in multilayer CMOS processes applied in IC manufacturing.

The three-dimensional representation describes at least a portion of an integrated circuit including an interconnect and terminals that can be used for simulation of the contributions of individual cells to an RC time constant of the interconnect. The RC time constant of the interconnect can be simulated from the material properties of individual cells and the operational parameters of the terminals. Simulations of the capacitive and conductive contributions of each cell to the overall electrical properties of the interconnect and/or the dielectric (e.g., conductance and capacitance) can be used to reshape the interconnect, including reassigning the material of individual cells, as an approach to optimizing the RC time constant of the interconnect.

Advantageously, the techniques described herein facilitate a departure from rectilinear interconnect layout conventions. At present, vendor process nodes are nearing the optical resolution threshold of semiconductor manufacturing systems. Rectilinear routing and the emphasis on edge-placement error as a figure of merit for manufacturability and process optimization constrains conventional layout design and introduces inefficiency into integrated circuit operation. As such, curvilinear layouts, illustrated in the forthcoming figures, represent a significant advancement toward improved integrated circuit design in the context of nanometer process nodes. For example, the techniques described herein permit retention of function to guide manufacturability determination, rather than edge placement error, and permit a physically meaningful RC value of an IC layout to serve as an optimization metric. Modifications can be made to an interconnect that optimize for RC value and improve the overall performance and robustness of IC interconnects in a way that is unavailable with current rectilinear routing conventions.

FIG. 1 is a schematic diagram of an example system 100 for modifying conducting interconnects in an integrated circuit layout, in accordance with embodiments of the present disclosure. Example system 100 includes: one or more servers 105, one or more client computing devices 110, one or more semiconductor manufacturing systems 115, and a network 120. The server(s) 105 include: a first database 125 of training data 130, a second database 135 of process data 137, a shape optimizer 140, and one or more machine learning models 150 encoded in software 155. As part of software 155, server(s) 105 include instructions by which the shape optimizer 140 and/or models 150 are trained and/or deployed using computer circuitry 160. In some embodiments, server(s) 105 further include a third database 165 storing design files 170, also referred to as integrated circuit layout files, which can be stored in one or more database file formats including but not limited to GDSII or OASIS.

The following description focuses on embodiments of the present disclosure implementing a networked system for deploying shape optimizer 140 as part of a detailed routing platform for optimization of integrated circuit layouts 170. It is contemplated, however, that some embodiments of the present disclosure include some or all of the processes being implemented on client computing device(s) 110, such as a laptop or personal computer. For example, the training of an untrained model 150 can be implemented using server(s) 105, while a trained model 150 can be transferred to client computing device 110 via network 120 and can be deployed directly on client computing device 110. Similarly, the constituent elements of example system 100 can be hosted and/or stored on a distributed computing system (e.g., a cloud system) rather than in a unitary system. For example, first database 125, second database 135, third database 165, and/or computer circuitry 160 can be implemented across a distributed system, such that portions of training data 130, process data 137, software 155, and/or design files 170 can be stored or executed by a distributed computing system in one or more physical locations.

In an illustrative example of the operation of example system 100, a user of client computing device 110 prepares a layout(s) 170 (in reference to FIG. 2) describing an integrated circuit to be manufactured using manufacturing system 115. In a conventional system, layout(s) 170 is routed based on design rules that can be encoded in software that can be stored and/or hosted on server 105 and/or client computing device 110. The design rule checking software generates a Boolean outcome describing whether the design is manufacturable and can also provide Boolean values for "required" or "recommended" rules. With design rule checking software, layout(s) 170 can be readily identified as compliant or non-compliant but are modified manually.

To that end, layout(s) 170 can be processed using shape optimizer 140 software 155 that is stored on server(s) 105 and/or client computing device(s) 110 to generate updated layout(s) 270 that is optimized for a physically meaningful parameter, including but not limited to an RC time constant. In some embodiments, layout(s) 170 is transferred to server(s) 105 via network 120, where shape optimizer 140 process layout(s) 170. In some embodiments, shape optimizer 140 are implemented as part of an interactive design environment hosted on client computing devices 110 and/or server(s) 105, such as a browser environment or a graphical user interface that presents layout information and one or more tools to design layout files 170.

Optimization criteria can also include target values for power consumption, integrated circuit area, processing power, and yield on a design and/or wafer-scale, that can be application specific. In this way, the aggregated effect of multiple detailed routing optimizations can be determined and assessed against a global optimization target. Additionally, compound optimization factors can be used to guide detailed routing. In an illustrative example, for designs to be used in highly specialized, space or power constrained, or failure-intolerant applications, lower yield can be tolerated in favor of other targets. For high volume applications that are failure tolerant or not size limited, yield can be prioritized at the expense of area or processing power. Similarly, indirect quantities can be adapted for use as optimization targets. For example, a total cost of ownership of an application specific integrated circuit to be used in data center operations can be applied as an optimization function.

Manufacturing system 115 is an example of complex systems in a pipeline between layout design and semiconductor foundries that process integrated circuit layouts and convert the design data into mask data. Mask data, in turn, is used to generate photomasks used in a photolithographic process of physical semiconductor device fabrication. In the context of example system 100, manufacturing system(s) 115 are represented by a network interface computer (e.g., a server), to simplify visual explanation. Typically, multiple processes (e.g., inverse lithography, optical proximity correction, process correction codes) are completed between "tapeout," which refers to the point at which a design rule compliant design for the integrated circuit is sent to the foundry, and fabrication of a compliant integrated circuit on a wafer.

In some embodiments, software 155 implements shape optimizer 140 in a way that generates one or more updated layouts 270 from layouts 170. In some cases, updated layouts 270 are merged to generate an updated layout 270 including multiple layers that is then outputted for a user, for example, as part of the interactive design environment. Outputting can include, but is not limited to, transfer to client computing device(s) 110 via network 120 and/or storing updated layouts 270 and/or optimization data in third database 165. Where example system 100 operates as part of an interactive design environment, outputting manufacturability data can include generating and communicating user interface data that causes client computing device 110 to present data for manufacturability parameters on a display 111.

In some embodiments, updated process data 137 and/or new process data 137 are received from manufacturing system(s) 115. Semiconductor processing technology is regularly improved as new devices and techniques are developed, so it is contemplated that example system 100 will support retraining of shape optimizer 140 and preparing new models 145-150 with changes to process data 137 or when new process data 137 are received.

In the illustrated embodiment, shape optimizer 140 includes functional sub-units described as modules 141-149 that are used to generate updated integrated circuit layouts 270. In some embodiments, shape optimizer 140 includes a discretization module 141 configured to take in layout data 215 (in reference to FIG. 2) that is used to generate a three-dimensional representation of layout file 170 including a number of cells. Shape optimizer 140 can include a physical simulation module 143 configured to solve electromagnetic equations as part of an electromagnetic simulation of the integrated circuit layout 170. The physical simulation module 143 can permit example system 100 to determine local contributions of cells to a characteristic metric of at least a portion of layout 170, which can include but is not limited to an RC value for an interconnect. A shape optimization module 145 can be included that is configured to implement a physically meaningful heuristic based on one or more outputs of physical simulation module 143. For example, shape optimization module 145 can include routines in software 155 for modifying the definition of one or more cells of the three-dimensional representation of layout 170 in accordance with relations between individual cell contributions near a boundary of an interconnect.

In some embodiments, the operation of physical simulation module 143 can be complemented with and/or implemented by one or more machine learning models 144 trained to generate at least a portion of updated layout(s) 270 using layout file(s) 170 as inputs. In an illustrative example, machine learning model(s) 144 can be or include deep convolutional neural network models trained using updated layouts 270 generated using physical simulation module 143. For example, a database 146 of training data can be generated by optimizing multiple layout files 170 using physics-based simulations. Training data can include paired layout file(s) 170 with corresponding updated layout(s) 270 that permit machine learning model(s) 144 to be trained by supervised learning. In some embodiments, shape optimizer 140 generates updated layout 270 by first generating an output layout of machine learning model(s) 144 that is then optimized by physical simulation module 143. Advantageously, supplementing physical simulation module 143 with machine learning model(s) 144 in this way can reduce the number of iterations of physical simulation module 143 used to generate updated layout(s) 270.

In some embodiments, shape optimizer 140 includes a process simulator 147 configured to perform a manufacturability simulation of updated layout 270. In some embodiments, process simulator 147 can perform manufacturability analysis based on process node design rules and/or retention of function criteria. A revision module 149 can be provided that is configured to revise updated layout 270 in light of the output returned by process simulator 147. For example, where process simulator 147 indicates that updated layout 270 is not manufacturable by semiconductor manufacturing system 115, revision module 149 can modify updated layout to satisfy manufacturability constraints of semiconductor manufacturing system 115. The techniques described herein can be applied at multiple characteristic scales. For example, routing of interconnects can be implemented at a first scale, while shape optimization of individual interconnects can be implemented using a smaller scale, where each respective scale can correspond to a characteristic size of the cells making up a three-dimensional representation.

It is understood that the techniques described herein can be iterative, with the output of a given iteration serving as the input to a subsequent iteration. In this way, an initial layout file 170 can be repeatedly modified toward an optimization target, such as minimizing an RC value for interconnect(s). To that end, example processes described in reference to the forthcoming figures are understood to represent individual iterations of an optimization technique that can include multiple iterations. Individual iterations can include additional operations, omit one or more operations, reorder constituent operations.

Figure 2:
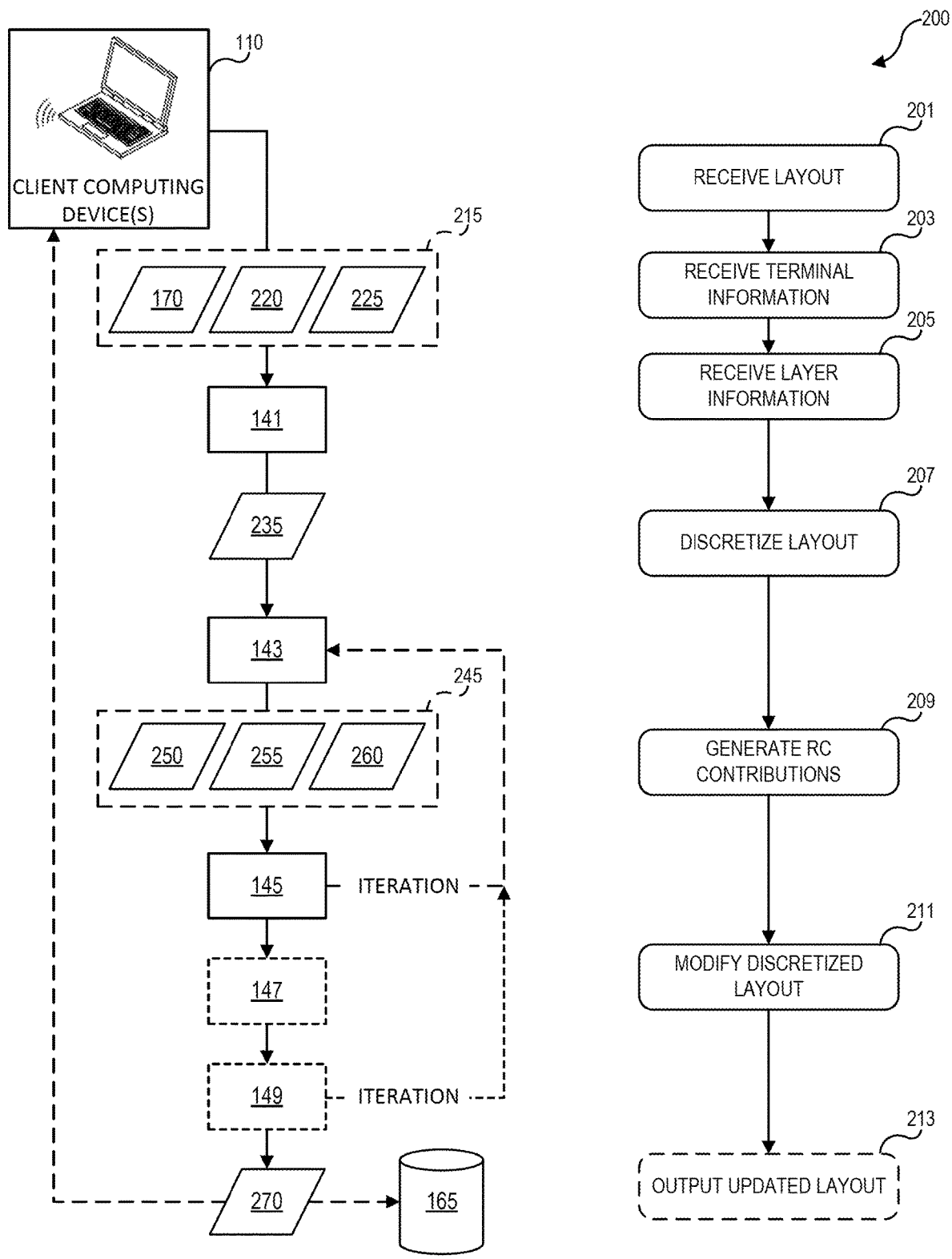
FIG. 2 is a schematic diagram illustrating an example process for generating an updated layout of an integrated circuit interconnect, in accordance with an embodiment of the present disclosure.

FIG. 2 is a schematic diagram illustrating an example process 200 for generating an updated layout 270 of an integrated circuit interconnect, in accordance with an embodiment of the present disclosure. It is appreciated that example process 200 may be implemented by a system performing operations (e.g., system 100 of FIG. 1) to perform iterative optimization of a characteristic metric to generate a manufacturable integrated circuit layout, which can be stored as a layout file 170 (e.g., in database 165 of FIG. 1). Example process 200 can be a computer-implemented method encoded in software 155 provided by at least one machine-accessible storage medium (e.g., non-transitory memory) that, when executed by a machine (e.g., server(s) 150 and/or client computing device(s) 110), will cause the machine to perform operations for generating updated layout(s) 270. Updated layout(s) 270 refers to updated integrated circuit layouts in the forthcoming description, as a form of layout file 170 that includes or otherwise incorporates at least a subset of multiple shape modifications made to interconnects and/or terminals.

It is further appreciated that the order in which some or all of the process blocks appear in example process 200 should not be deemed limiting. Rather, one of ordinary skill in the art, having the benefit of the present disclosure, will understand that some of the process blocks may be executed in a variety of orders not illustrated, or in parallel. Furthermore, while example process 200 is described as a sequence of operations implemented by modules 141-149 of shape optimizer 140, it is contemplated that software 155 can be provided that is not modular. Alternatively, one or more modules can be segmented into sub-modules as part of load optimization, for example, as part of parallelizing or executing software 155 on a distributed system.

At operation 201, example process 200 includes receiving layout data 215. As described in more detail in reference to FIG. 1, layout file 170 can be or include a numerical description of one or more interconnects between terminals associated with the integrated circuit. The description can correspond to a netlist, a layout, a schematic, a diagram, or any other representation of an integrated circuit for which terminal location, quantity, and connectivity is described. In some embodiments layout file 170 includes wiring route information (e.g., unoptimized or unfabricable wiring routes), information regarding a number of metallization layers, physical dimensions of the integrated circuit, wiring routes, or the like. It is appreciated that an integrated circuit can contain many components (e.g., resistors, transistors, capacitors, diodes, transistors, or other electronic subcomponents) with a specific or relative spatial arrangement of the components provided by the description. Accordingly, layout file 170 indicates how individual terminals in the plurality of terminals are electrically coupled. In some embodiments, layout file 170 also describes information related to terminals not directly located on the integrated circuit (e.g., a ground connection).

At operations 203 and 205, example process 200 includes receiving terminal information 220 and layer information 225. Terminal information 220 refers to data describing one or more operating parameters of at least a subset of the terminals included in a layout file 170. In an illustrative example, a layout file 170 can include a description of an interconnect coupling a driver terminal to a load terminal, as described in more detail in reference to FIG. 4A. In this example, terminal information 220 can describe operating parameters for the portion of the layout file 170, including but not limited to a driver impedance, an operating frequency, and/or a load capacitance. In some embodiments, terminal information 220 includes metadata identifying each terminal in reference to layout file 170, such that terminals included in layout file are correctly associated with terminal operating parameters.

Layer information 225 can include, but is not limited to, material property information for a layer corresponding to layout file 170. For example, layout file 170 can describe a via layer, a metal layer, or other layer as may be included in a multilayer integrated circuit fabricated by a CMOS-process. In this way, layer information 225 can include material property information including electronic properties, thermal properties, elemental composition, phase/structure information, or the like. Examples of electronic properties include but are not limited to conductivity, permittivity, and dielectric breakdown voltage. Examples of thermal properties include but are not limited to conductivity. In an illustrative example, layer information 225 can define a layer as a metal layer, and can define two or more materials for the layer including a dielectric oxide and a conducting metal. Layer information 225 can be associated to layout file 170 by a spatial coding of layout file 170, for example, where an interconnect is coded to a metal and regions outside interconnect are coded to a dielectric. In some embodiments, layout file 170 can include multiple interconnects and/or terminals within a given region, such that multiple regions of layout are represented as conducting materials, as described in more detail in reference to FIGS. 4A-12.

At operation 207, example process 200 includes discretizing layout file 170 as part of generating a three-dimensional representation 235 of at least a portion of layout file 170. Three-dimensional representation 235 can include multiple cells, in which each cell corresponds to a discrete volumetric element describing a portion of layout file 170. As previously described, a cell is a volumetric element with a specific size, shape, and volume. In some embodiments, cells share a common size, a common shape, and/or a common volume. In some embodiments, cells may have diverse sizes, shapes, and/or volumes such that the layout file 170 can be discretized into a more general set of cells of varying sizes and shapes.

For example, in one embodiment, the plurality of cells may include a first cell having a first volume and a second cell having a second volume different than the first volume. There may be certain computational advantages for having different sized cells. For example, regions of the simulated environment farther from a boundary of an interconnect can be generated with a larger size relative to cells on or near the interconnect boundary. Advantageously, dynamic cell sizing can reduce computational resource demand of the electromagnetic simulation techniques described herein, thereby improving the operation of example process 200 on example system 100. It is appreciated that the individual cells are not necessarily limited to a specific shape, which may include any one of or a combination of cubes, cuboids, triangular prisms, spheres, cylinders, tetrahedrons, hexagonal prisms, pyramids, or other shapes not explicitly listed. Rather, it is appreciated that cells can be sized, shaped, and/or positioned to facilitate an arbitrary resolution for three-dimensional representation 235. For example, cells can be defined as arbitrary volumes between an array of nodes mapped onto layout file 170. The positioning of nodes in the array of nodes can be guided by geometrical aspects of layout file 170. For example, corners or other feature-dense regions of layout file 170 can correspond with a higher node density, while feature-sparse regions can correspond to a lower node density. In some embodiments, each of the individual cells are sufficiently small such that a given terminal included in the plurality of terminals of the integrated circuit is represented by more than one cell included in the plurality of cells.

In some embodiments, generating three-dimensional representation 235 can include configuring a coordinate system (e.g., cartesian, cylindrical, spherical, or the like), a size, a shape, and/or a number of cells. Configuration can include assigning the material properties of cells to be consistent or otherwise representative of the description of the integrated circuit (e.g., based on the arrangement and position of the plurality of terminals associated with the integrated circuit). For example, cells representative of terminals of a given net can be assigned a material property corresponding to a conductor (e.g., a metal such as Au, Ag, Al, Cu, Ti, a combination thereof to form a metal alloy, or other suitable materials). Conversely, cells external to an interconnect, terminal, or other conductor can be assigned material properties of an insulator or dielectric (e.g., oxides such as $SiO_2$, $SiO_x$, SiN, or the like, high-k dielectrics, low-k dielectrics, etc.).

As part of shape optimization, an initial three-dimensional representation 235 can be generated from a layout file 170 that has already been routed, including interconnects laid out in accordance with rectilinear routing convention (e.g., "Manhattan Routing"). In subsequent iterations of example process 200, operations 201-207 can be omitted, where updated layout 270 can be stored as a three-dimensional representation 235.

At operation 209, example process 200 includes generating individual contributions of cells making up three-dimensional representation 235 to one or more electronic properties of an interconnect. Individual contributions can include capacitive contributions 250, conductive contributions 255 to a characteristic metric 260. Characteristic metric 260 can be based on an objective function defining one or more parameters of the interconnect. Characteristic metric 260 can include any electric characteristic or parameter that can be derived or otherwise inferred from first principles simulations of the given net and/or the integrated circuit based on the simulated environment such as, but not limited to, resistance, capacitance, admittance, admittance density, impedance, or RC time constant. In an illustrative example, characteristic metric 260 can correspond to an RC time constant for an interconnect that can be used as a convergence target for multiple iterations of example process 200. Individual contributions 250 and 255 can be used as part of a physically meaningful heuristic or other model approach in shape optimization, with which characteristic metric 260 can be revised as part of optimization of layout file 170. For example, convergence of the physical simulation to an optimum RC value can correspond to about 20 iterations or fewer, about 19 iterations or fewer, about 18 iterations or fewer, about 17 iterations or fewer, about 16 iterations or fewer, about 15 iterations or fewer, about 14 iterations or fewer, about 13 iterations or fewer, about 12 iterations or fewer, about 11 iterations or fewer, about 10 iterations or fewer, about 9 iterations or fewer, about 8 iterations or fewer, about 7 iterations or fewer, about 6 iterations or fewer, about 5 iterations or fewer, about 4 iterations or fewer, about 3 iterations or fewer, about 2 iterations or fewer, or 1 iteration. With added complexity of layout(s) 170, however, the number of iterations can exceed 20.

In one or more embodiments, an electromagnetic simulation used to determine individual contributions 250 and 255 corresponds to a simulation of the given interconnect. The electromagnetic simulation can generate electrostatic and/or electromagnetic field values for at least a subset of cells included in three-dimensional representation 235 based at least in part on layer information 225 and terminal information 220. In some embodiments, the local contributions to the characteristic metric are computed based on field values obtained via electromagnetic simulation (e.g., physical simulation module 143. For example, current density, admittance density, or more generally flux of a parameter related to resistance or capacitance of the interconnect can be calculated for the individual cells. In this way, cell-level simulation results that are spatially localized can be used to determine how current is flowing through the simulated environment in response to a bias signal, which in turn can be used to calculate the local contribution of the individual cells to characteristic metric 260.

It is further appreciated that since the field values from the electromagnetic simulation are based on the material properties of the individual cells, the local contributions are calculated, at least in part, based on the material properties. In some embodiments, admittance density for at least a subset of cells is calculated based at least in part on the field values to determine how cells influence the admittance matrix of the interconnect. In some embodiments, admittance density corresponds to a scalar field of the simulated environment at a position that is discretized using cells. The admittance density can be understood to describe a local contribution to the overall conductance and capacitance of the interconnect. It is appreciated that the admittance density can be derived, in part, from field values of an electromagnetic simulation of three-dimensional representation 235, as described in more detail in reference to FIGS. 3A-3F and FIGS. 3A-4B.

At operation 211, example process includes modifying three-dimensional representation 235 using the output of physical simulation module 143 and/or machine learning model(s) 144. As described in more detail in reference to FIGS. 3A-4B and FIG. 7, the local contributions of cells to a characteristic metric (e.g., a convergence target or optimization criterion) can be used to reshape interconnect(s) by reassigning material property information of one or more cells in three-dimensional representation 235 or by deforming one or more cells of three-dimensional representation 235. In an illustrative example, capacitive and conductive contributions to an overall RC value of an interconnect for at least a subset of cells in three-dimensional representation 235 can be determined using layer information 225 and terminal information 220. In this example, the material identifier for one or more cells of the subset of cells can be modified based at least in part on a comparison of the relative magnitudes of the respective contributions of each cell. Exemplary embodiments of three-dimensional representations 235 generated at operation 211 are described in more detail in reference to FIGS. 4A-7C, FIGS. 8-10 and FIG. 11.

In some embodiments, example process 200 includes one or more sub-operations to revise the modification of operation 211. For example, modules 147 and/or 149 can validate the manufacturability of three-dimensional representation by a process simulation to generate a predicted manufactured state of modified three-dimensional representation 235 for semiconductor manufacturing system 115, as described in more detail in reference to FIG. 1. Where the manufactured state fails to reproduce one or more functional aspects of the modifications to three-dimensional representation 235, the manufacturability check implemented as module 147 can return a simple Boolean false value or can indicate which modifications are likely to introduce defects into the manufactured layout. Advantageously, completing a manufacturability check using a physically meaningful process can facilitate curvilinear routing, at least in part because heuristic and/or rules-based manufacturability validation tools (e.g., design rule checker algorithms) are typically formulated for conventional rectilinear routing.

With the output of manufacturability analysis, example process 200 can include revising the modifications to three-dimensional representation 235 to maintain the function of the interconnect in the context of layout file 170. In some embodiments, machine learning model(s) 144 can be trained to revise the modifications to three-dimensional representation 235 to preserve manufacturability, for example, by supervised training using a set of paired manufacturable layouts 170 and non-manufacturable layouts 170. In this context, training data can be generated from a number of layout files 170 that are validated using a physics-based process model. Such physical simulations can include elements configured to identify cells and/or regions of three-dimensional representation 235 likely to be incorrectly manufactured, using, for example, process models developed for the constituent operations included as part of manufacturing an integrated circuit using semiconductor manufacturing system 115. With retention of function as a standard for determining manufacturability, rather than other figures of merit (e.g., edge placement error), operation 211 can advantageously generate a physically meaningful manufacturability score that facilitates a transition to curvilinear interconnect shape. As illustrated, iteration of example process 200 can occur over a subset of constituent operations. For example, iteration can include operations 209 and 211, where layer information 225 and terminal information 220 is maintained for each iteration based on layout data 215 received at operations 201-205. Similarly, modifications can be made to three-dimensional representation 235 on a cell-wise basis, rather than to layout file (e.g., as a transformation of one or more polygons or vertices of layout file 170). As such, encoding a layout file 170 with three-dimensional representation 235 and modifications from operation 211 can include one or more image processing techniques applied to three-dimensional representation 235 to convert quantized regions described by cells into smooth regions with lines. In so doing, a portion of conducting material in a subset of cells can be reassigned to dielectric material, and a portion of dielectric material in a subset of cells can be reassigned to conducting material. In some embodiments, however, where cells have a characteristic dimension below a lower resolution limit of one or more processes of semiconductor manufacturing system 115, updated layout can retain quantized boundaries that are smoothed during manufacturing.

At operation 213, example process 200 includes outputting updated layout 270. Outputting updated layout 270 can include, but is not limited to, generating a layout file 170 using three-dimensional representation 235 incorporating modifications made over one or more iterations of operations 209 and 211. In some embodiments, updated layout 270 can be encoded as a layout file 170 such as GDSII or OASIS, a maskset, or any other data format that is used in integrated circuit design. In some embodiments, updated layout 270 can be encoded as visualization data that can be distributed or otherwise accessed by client computing device(s) 110 as part of an interactive design environment. In this way, one or more users of the interactive design environment can access and/or modify layout file(s) 170 and/or updated layout 270 concurrently or in parallel.

Detailed Discussion of Interconnect Shape Modification

With routes successfully established between the terminals, capacitances between nets can be determined and used to optimize the shape of interconnects to improve RC, although other optimization targets are also contemplated including but not limited to electromigration reduction and dielectric breakdown avoidance. To that end, the admittance density $\underline{y}$ of Eq. (1), repeated below, can be applied to understand which regions contribute to the RC and then formulate a heuristic to reshape the interconnects to improve RC.

$$y_{k\ell}(r) = iw\kappa(r)(\nabla f_k(r))^* \cdot (\nabla f_\ell(r)), \tag{1}$$

where the fundamentals $f_k$ are the solution of the complex Laplace equation $$\nabla \cdot (\kappa(r) \nabla f_k(r)) = 0, \tag{2}$$

with a Dirichlet boundary condition of 1 on terminal k and 0 on all other terminals. Neumann boundary conditions apply everywhere else. Here, the complex material parameter is given by:

$$\kappa(r) = \varepsilon(r) - \frac{i}{w}\sigma(r), \tag{3}$$

with the permittivity is "$\varepsilon$," the conductivity is "$\sigma$," and the angular frequency is "$\omega$." Then the admittance matrix of the system with N ports can be determined as the volume integral over the admittance density:

$$\underline{Y}_{k\ell} = iw \int_D dV \ \kappa(r)(\nabla f_k(r))^* \cdot (\nabla f_\ell(r)). \tag{4}$$

Without being bound to a particular physical mechanism, it is understood that RC depends on the loads attached to the output terminals of the interconnects, which represent transistor gate contacts in CMOS logic. Where a gate capacitance of a transistor gate is large, interconnect shape optimization can include reducing an interconnect resistance while the interconnect capacitance can be negligible or substantially negligible. While such a scenario was typical of older vendor process nodes, in modern technology nodes as in FinFET technology, interconnect capacitance is comparable to the transistor gate capacitance. As such, modifying an interconnect shape can depend on the ratio between the wire capacitance and the attached load.

Input Admittance and RC: RC can be calculated from admittances based at least in part on deriving the impact of the admittance density of a single interconnect on the overall RC of a routed IC layout. As part of generating the overall RC time constant, the admittance matrix $\underline{Y}_{k\ell}$ can be determined for a fully routed system of N ports, using the following expression:

$$\underline{Y}_{k\ell} = iw \int_D dV \ \kappa(r)(\nabla f_k(r))^* \cdot (\nabla f_\ell(r)). \tag{5}$$

In addition, regions of a three-dimensional representation of the layout file 170 can be assigned to terminals that either belong to transistors or external pins. The input admittance $$\underline{Y}_i^{in}$$

of input i, can be defined by $$\underline{I}_i =: \underline{Y}_i^{in} \underline{V}_i^{appl} \tag{6}$$

and is determined from the underlying system of interconnects and transistors.

As the attached loads (e.g., transistors) are non-linear components, transistor resistances and capacitances are assessed based on instantaneously applied voltage signals. As a simplifying assumption, the gate capacitances can be bounded by assuming the largest capacitance of all operating points for each transistor t:

$$C_{max}^t = \max(C_{gate}^t(V_{GS}, V_{DS})). \tag{7}$$

In practice, however, an effective capacitance for characteristic voltage ramp or slew may be selected in accordance with embodiments of the disclosure.

For the purposes of RC calculation, low-frequency components of the capacitance are significant. Since the capacitance is frequency-independent up to somewhere around the cut-off frequency, frequency dependence will be assumed to be negligible in some embodiments. In order to calculate the input admittance $$\underline{Y}_i^{in}$$

at the terminal i, we will also need to assume a load admittance at all other input terminals j≠i. To simplify, we can assume ideal ohmic contacts, i.e.

$$\underline{Y}_j^L \to \infty.$$

Finally we can calculate the input admittance for terminal i as:

$$\underline{I}_k = \sum_\ell \underline{Y}_{k\ell} \underline{V}_\ell^{appl} \stackrel{!}{=} \begin{cases} \underline{I}_i & \text{if } k = i, \\ -\underline{Y}_k^L \underline{V}_k^{appl} & \text{else,} \end{cases} \tag{8}$$

where we set the currents to their appropriate values given the loads Y at all but the input terminal i. And therefore we find the following linear equations that can be solved directly:

$$\begin{cases} \underline{I}_i = \sum_\ell \underline{Y}_{i\ell} \underline{V}_\ell^{appl}, \\ 0 = \sum_\ell (\underline{Y}_{k\ell} + \underline{Y}_k^L \delta_{k\ell}) \underline{V}_\ell^{appl}, \forall \ k \neq i \end{cases} \tag{9}$$

where $\delta_{k\ell}$ is the Kronecker-delta.

The input admittance $$\underline{Y}_i^{in}$$

defined in Eq. (6) can be determined from Eq. (9).

$$V_\ell^{appl}$$

with l≠i values can be computed and used in the top equation of Eq. (9) but the bottom equations contain precisely that information by expressing all $$V_\ell^{appl}$$

with l≠i as a function of $$V_l^{appl}$$

With the input admittance $$\underline{Y}_i^{in},$$

the $RC_i$ at terminal i can be calculated using the expression:

$$RC_i = \frac{\text{Re}\{\underline{Y}_i^{in}\}}{\omega \text{Im}\{\underline{Y}_i^{in}\}}. \tag{10}$$

$RC_i$ accounts for capacitive and resistive effects as well as other phenomena including but not limited to crosstalk and/or coupling efficiency based on the loads attached to other wires. However, Eq. (10) describes the instantaneous RC time constant. For non-linear elements such as transistors the instantaneous RC time constant differs from the RC measured in large-signal operation. For this reason, the following discussion assumes the worst-case gate capacitance of all operating states. In this way, the objective function for optimizing interconnect shape for RC value is understood to be bounded by the worst-case RC.

RC Improvement Heuristic: Equation (10) illustrates that optimizing wires for RC is not trivial. First, the input admittance $$\underline{Y}_i^{in}$$

is a complicated function of the elements of the admittance matrix $\underline{Y}_{kl}$ that is understood to lack an analytical solution. Second, RC is determined by the quotient in Eq. (10), which means that its value is determined non-locally. In this way, an algorithm to optimize RC cannot easily determine if a local change to the interconnect structure (e.g., a widening and/or narrowing of an interconnect at one or more locations of the interconnect) improves or worsens the output of an objective function. Third, the transistor loads appearing in the implicit input admittance system of Eq. (9) are significant factors in determining how the interconnect structure is to be optimized, due to the nature of how RC is calculated. In some embodiments, the magnitude of loads at terminals can render the interconnect capacitance substantially negligible, resulting in an optimal interconnect that is wide to increase conductivity. This was the case in older vendor process nodes, but in contemporary and foreseeable process nodes the interconnect capacitance and gate capacitance can be comparable. In such cases, a width of an interconnect can be dependent on the length of the interconnect. For example, a relatively short interconnect can be relatively wide, while longer interconnects can be characterized by a capacitance that indicates improvement of RC by narrowing the width.

In short, interconnect optimization represents a significant computational challenge. Advantageously, the numerical techniques described herein can be supplemented with simple heuristics to improve the timing of circuits, such as widening an interconnect, inserting vias to reduce resistance, and/or increasing the spacing between or decreasing the parallel run-length of proximal wires to reduce cross-coupling capacitances. As such, the RC-optimization landscape can be understood to allow an algorithm to follow a gradient towards a local optimum. Such mixed-approaches, including finite-volume methods and simple heuristics can result in improved IC performance by modifying layout files 170 while also reducing the computational resource demand of optimization processes.

This structure of capacitances is illustrated by algorithms, such as FasterCap, which express the interconnect capacitances in terms of Green's functions of the Laplace equation because the electric field strength in between interconnects is an equivalent measure for capacitance. Likewise, the current density within the interconnects is an equivalent measure for conductance through Ohm's law. As such, the admittance density of Eq. (1) can be used to determine a measure of local conductance and capacitance contributions to the overall admittance of equation (5). In this way, contributions in space from the admittance density $\underline{y}$ can serve as a basis for determining the RC of Eq. (10).

As a preliminary matter, a heuristic is described to improve the interconnect design without numerical or analytical methods. Starting from layout 170 including an interconnect and one or more terminals, respectively described by a material parameter field $\kappa(r)$ defined using the expression:

$$\kappa(r) = \varepsilon(r) = -\frac{i}{\omega}\sigma(r). \tag{11}$$

In this way, the layout file 170 can be updated based at least in part on a determination of whether a spatial coordinate r should have the material parameters of an interconnect metal or of an insulator and/dielectric.

Single Load: Attached loads $$\underline{Y}_k^L, \forall k \neq a,$$

significantly impact optimization of wire shape at input terminal a, which determines at least in part whether an interconnect can be widened to carry more current or narrowed to avoid capacitive cross-coupling, as part of optimizing $RC_a$. In some cases, it can be assumed that a net connects two terminals a and b, with a single load $$\underline{Y}_b^L$$

while all other terminals are shorted with $$\underline{Y}_k^L$$

Inserting these loads into Eq. (9), the following expression is obtained:

$$\begin{cases} \underline{I}_a = \sum_\ell \underline{Y}_{a\ell} \underline{V}_\ell^{appl}, \\ 0 = \sum_\ell (\underline{Y}_{b\ell} + \underline{Y}_b^L \delta_{b\ell}) \underline{V}_\ell^{appl}, \\ \underline{Y}_k^L \underline{V}_k^{appl} \to 0, \forall k \neq a, b, \end{cases} \tag{12}$$

In the second constituent expression of equation (12), terms with relatively small magnitudes, for example other than loads at shorted terminals, can be neglected. Since $$\underline{Y}_k^L$$

is non-zero, applied biases at the shorted ports k can be understood that applied voltage approaches zero $$\underline{V}_i^{appl} \to 0,$$

Inserting this into the first two constituent expressions yields the following equation:

$$\begin{cases} \underline{I}_a = \underline{Y}_{aa}\underline{V}_a^{appl} + \underline{Y}_{ab}\underline{V}_b^{appl}, \\ 0 = \underline{Y}_{ba}\underline{V}_a^{appl} + (\underline{Y}_{bb} - \underline{Y}_b^L)\underline{V}_b^{appl}. \end{cases} \quad (13)$$

Solving the second constituent expression for $$V_b^{appl}$$

and inserting the result into the first constituent expression permits the following equation for input admittance to be derived:

$$\underline{Y}_a^{in} := \underline{Y}_{aa} - \frac{\underline{Y}_{ab}\underline{Y}_{ba}}{\underline{Y}_{bb} + \underline{Y}_b^L} \quad (14)$$

which is understood to be an expression for an interconnect coupling two terminals with a single load.

Expanding the expression for $RC_a$ of equation (10) into real and imaginary components, equation (14) can be used to derive the following expression for $RC_a$:

$$RC_a = \frac{1}{w} \frac{\text{Re}\{\underline{Y}_{aa}\}|\underline{Y}_{bb} + \underline{Y}_b^L|^2 - \text{Re}\{\underline{Y}_{ab}\underline{Y}_{ba}(\underline{Y}_{bb} + \underline{Y}_b^L)*\}}{\text{Im}\{\underline{Y}_{aa}\}|\underline{Y}_{bb} + \underline{Y}_b^L|^2 - \text{Im}\{\underline{Y}_{ab}\underline{Y}_{ba}(\underline{Y}_{bb} + \underline{Y}_b^L)*\}}. \quad (15)$$

For a single interconnect coupling terminal a to terminal b, the admittance matrix can expressed as $$\hat{\underline{Y}} = \begin{pmatrix} \underline{Y}_{aa} & \underline{Y}_{ab} \\ \underline{Y}_{ba} & \underline{Y}_{bb} \end{pmatrix} = \begin{pmatrix} G & -G \\ -G & G + iwC \end{pmatrix}. \quad (16)$$

For CMOS-technology, it can be assumed that terminal b corresponds to a gate that acts as a capacitive load. As such, $$\underline{Y}_b^L$$

can be expressed as a complex value $$\underline{Y}_b^L$$

with which the $RC_a$ of equation (13) can be rewritten as:

$$RC_a = \frac{C + C^L}{G}. \quad (17)$$

In equation (17), the structure of the RC time constant is illustrated as a ratio of capacitive and conductive contributions. As such, the conductivity of the interconnect can be compared against the capacitances of the load and the interconnect. The output capacitance C is combined with the load capacitance $C^L$ at least in part because it can be understood to be physically indistinguishable, from the perspective of the input a, whether the capacitance at the output is part of the interconnect structure or part of the load.

Figure 3A:
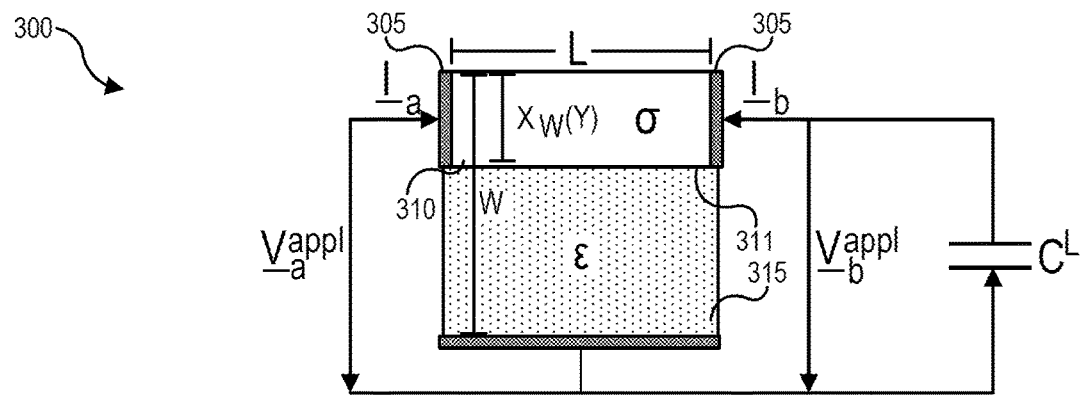
FIG. 3A is a schematic diagram illustrating a toy model of a two-port interconnect, in accordance with embodiments of the present disclosure.

Constant-Width Toy Model Optimization: FIG. 3A is a schematic diagram illustrating a toy model 300 of a two-port interconnect 310, in accordance with embodiments of the present disclosure. FIG. 3A illustrates an interconnect 310 that is electrically coupled with two terminals 305 (e.g., "ports") with an equivalent circuit such with a physical size, conductance G, and capacitance C. In the following treatment, interconnect 310 is optimized to drive a load $C^L$. FIG. 3A illustrates toy model 300 where transmission line effects are ignored, such as an effect that the capacitance is distributed over a length "L" of the interconnect 310. As such, the following simple analytical model for the conductance and capacitance applies:

$$G = \frac{x_w H}{L}\sigma \quad (18)$$

$$C = \frac{LH}{(W - x_w)}\varepsilon$$

where $x_w$, L, W are dimensions as indicated in FIG. 3A and H is the height in the remaining direction. $\sigma$ and $\varepsilon$ are conductance and permittivity, respectively.

Inserting the terms in equation (18) into equation (17) provides the following equation:

$$RC_a = \frac{1}{x_w}\left(\frac{L^2}{W - x_w}\frac{\varepsilon}{\sigma} + \frac{L}{H}\frac{C^L}{\sigma}\right). \quad (19)$$

Equation (16) reveals that RC can scale with $L^2$ if interconnect 310 capacitance is comparable or larger than load capacitance. As such, short wires that drive large loads can be understood to scale with L. As described in more detail in reference to FIG. 2, in some embodiments, the local width of interconnect 310 is a manipulated variable in an optimization scheme to improve interconnect 310 performance (e.g., by minimizing $RC_a$). In such an approach, the width $x_w$ of interconnect 310 is understood to depend at least in part operational parameters of the load, represented by terminal information 220. In the two-port scenario illustrated in FIG. 3A with a uniform width $x_w$, the optimum width for a given load capacitance $C^L$ is described by the expression:

$$x_{opt}(C^L) = W\left(1 + \frac{C_0}{C^L}\right)\left(1 - \sqrt{1 - \frac{1}{1 + \frac{C_0}{C^L}}}\right). \quad (20)$$

In equation (20), $C_0$ is defined as the capacitance of interconnect 310 at full width L, or $$C_o = \frac{LH}{W}\varepsilon.$$

It should be noted that the location of the minimum $RC_a$ value $x_{opt}$ is independent of the conductivity and can be determined from the ratio of intrinsic capacitance of interconnect 310 and external load capacitance. For small loads, interconnect 310 predominantly drives its own capacitance, leading to an optimal width of $x_{opt} \approx W/2$. With increasing load, however, the delay resulting from charging of the load capacitance becomes significant. As a result, $x_{opt}$ increases. Note that due to the reciprocal dependence of interconnect 310 capacitance on dielectric width, intrinsic wire capacitance can be balanced against capacitive load. As such, a limit of $x_{opt} \to W$ is asymptotically approached as capacitive load approaches infinity ($C^L \to \infty$).

For an RC-based shape optimization, a position of one or more interfaces between conducting and dielectric materials can be modified based at least in part on relative magnitudes of the electric fields stored in the conductor and dielectric. To that end, the admittance density of equation (1) can be expressed in both the interconnect metal M and the dielectric OX (in the example of an oxide) as:

$$\underline{y}(r) = \begin{cases} \underline{y}_M = \dfrac{\sigma}{L^2}, & \text{if } r \in M \\ \underline{y}_{OX} = \dfrac{i\omega\epsilon}{(W-x_w)^2}, & \text{if } r \in OX \end{cases} \quad (21)$$

For which the expression for RC is:

$$RC_a = \dfrac{\int dV \dfrac{1}{\omega} \text{Im}\{\underline{y}(r)\} + C^L}{\int dV \text{Re}\{\underline{y}(r)\}}. \quad (22)$$

Equation (22) qualitatively reveals a technique to locally optimize an interconnect 310: At an interface between metal and oxide, if the imaginary part of the admittance density has a larger contribution to the overall capacitance than the real part of the admittance density has to the overall conductance in the conductor, move interconnect boundary 311 to increase the capacitor plate distance (e.g., shrinking interconnect 310). If, on the other hand, the real part in the conductor has a larger contribution, move interconnect boundary 311 to increase conductor cross-section.

For a gradient-based optimization, a differentiable function of RC is derived, at which the optimum can correspond to a stationary point where the differential $\delta RC_a[\underline{y}]=0$. Solving equation (22) for the stationary point yields an expression that holds for all values of $r_0$:

$$0 = \dfrac{\text{Im}\{\underline{y}(r_0)\}}{\omega C + \omega C^L} - \dfrac{\text{Re}\{\underline{y}(r_0)\}}{G}. \quad (23)$$

As revealed by equation (23), in an optimal configuration, the local capacitive and conductive contributions balance each other, with the respective contributions being defined as:

$$C_C(r) = \dfrac{\text{Im}\{\underline{y}(r)\}}{\omega C + \omega C^L}, \quad (24)$$

$$C_G(r) = \dfrac{\text{Re}\{\underline{y}(r)\}}{G}. \quad (25)$$

Where equation (24) describes the local capacitive contribution at position r, and equation (25) describes the local conductive contribution at position r. From these expressions, informed by the qualitative approach described in equation (22), a heuristic to improve RC of an interconnect can be formulated as follows, in terms of $r_{inter}$, being a position on interface 311 between interconnect 310 and a dielectric:

If $C_C(r_{inter}) > C_G(r_{inter})$, decrease interconnect width.
If $C_C(r_{inter}) < C_G(r_{inter})$, increase interconnect width.
If $C_C(r_{inter}) = C_G(r_{inter})$, maintain interconnect width.

To generalize the previous treatment of RC-circuits, a voltage generator $$\underline{V}_G^{appl}$$

can be included with an associated generator admittance $\underline{Y}^G$. In digital circuits the generator is typically the power grid and the generator admittance $\underline{Y}^G$ is associated with interconnect 310 and MOSFET channel resistance and capacitances. The real part of the generator admittance can be associated with the channel conductance of the MOSFET in the on-state and can therefore be interpreted as the drive strength for interconnect 310. Different drive strengths can lead to different optimal interconnect 310 design, similarly to what has been previously demonstrated for load admittance.

To determine the RC, the input admittance $$\underline{Y}_G^{in}$$

can be found from the ideal voltage source, $$\underline{V}_G^{appl}$$

using the relation:

$$\underline{I}_G =: \underline{Y}_G^{in} \underline{V}_G^{appl}. \quad (26)$$

Where the generator current $\underline{I}_G$ can be related to admittance values $\underline{Y}^{in}$ and $\underline{Y}^G$ for a two-port interconnect 310 using the expression:

$$\underline{I}_G = \dfrac{\underline{Y}^{in}}{1 + \dfrac{\underline{Y}^{in}}{\underline{Y}^G}} \underline{V}_G^{appl}. \quad (27)$$

Equation (27) can be combined with equation (26) and rearranged to find an expression for $$\underline{Y}_G^{in}$$

as follows:

$$\underline{Y}_G^{in} = \dfrac{\underline{Y}^{in}}{1 + \dfrac{\underline{Y}^{in}}{\underline{Y}^G}} = \left(\dfrac{1}{\underline{Y}^G} + \dfrac{1}{\underline{Y}^{in}}\right)^{-1}.$$

Equation (28) can be combined with equation (25) to yield an expression for RC as:

$$RC = \frac{\text{Re}\{Y_G^{in}\}}{\omega \text{Im}\{Y_G^{in}\}}. \tag{29}$$

Figure 3B:
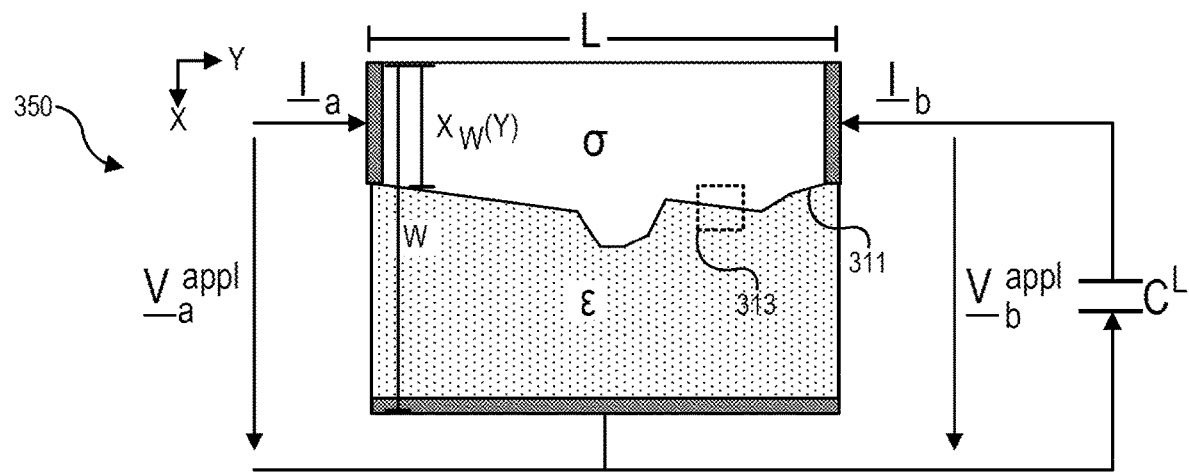
FIG. 3B is a schematic diagram illustrating an example variable width interconnect coupling two terminals, in accordance with embodiments of the present disclosure.

FIG. 3B is a schematic diagram illustrating an example variable width interconnect 310 coupling two terminals 305, in accordance with embodiments of the present disclosure. To derive the corresponding two-port admittance matrix, an approximation based on the solution of the Laplace equation for the fundamentals can be used to reduce the complexity of description using equivalent circuits. To that end an assumption can be made that the potential in the highly conductive interconnect is constant in an x-direction. In FIG. 3B, the x-direction is defined as shown.

With an assumed constant conductivity, the Laplace equation for the fundamentals $f_a$ and $f_b$ can be understood as a statement of current conservation as a function of position in y between terminals 305. More specifically, a metal fundamental $$f_a^M$$

can be defined for the metal region. In this context, an integral over a control volume containing two slices of interconnect 310 at y=0 and at some arbitrary internal point $y_0$, using the Gaussian integration theorem, renders the expression:

$$0 = \nabla \cdot (\sigma \nabla f_a^M(r)) = x_w(y_0)\frac{df_a^M}{dy}(y_0) - x_w(0)\frac{df_a^M}{dy}(0). \tag{30}$$

As equation (30) is a general expression for any $y_0$, conservation of current provides that $I_0$ is constant, and the metal fundamental $$f_a^M$$

can be defined using the expression:

$$f_a^M(y) = 1 + I_0 \int_0^y \frac{dy'}{x_w(y')}. \tag{31}$$

As previously noted, the subscript "a" is assigned to one of the terminals 305 coupled by interconnect 310. In this way, for terminal "b" the metal fundamental can be defined by:

$$f_b^M(y) = -I_0 \int_0^y \frac{dy'}{x_w(y')} = 1 - f_a^M(y). \tag{32}$$

For equations (31) and (32), the boundary conditions are defined as $$f_a^M(0) = 1 \text{ and } f_b^M(0) = 0,$$

respectively.

Expressions for the fundamentals in a dielectric can be expressed as simple linear functions decaying from their respective values in the metal $$f_{a/b}^M(y)$$

to zero at the position of the electrode x=W, shown in FIG. 3B. The resulting dielectric fundamental function can be defined for the dielectric as:

$$f_{a/b}^{OX}(x,y) = f_{a/b}^M(y)\left(1 - \frac{x - x_w(y)}{W - x_w(y)}\right) = f_{a/b}^M(y)\frac{W - x}{W - x_w(y)}, x \geq x_w(y). \tag{33}$$

With a simplifying assumption that $$\frac{dx_w}{dy} \approx 0,$$

equation (28) can be used with equation (29) to derive a constraint on admittance densities arising from the stationary point of RC. Once found, the stationary point can be defined as a fixpoint for modifying a shape of interconnect 310 (e.g., by displacing at least a portion of interface 311). Using a general form of the RC expression that includes generator and load admittances, as described in equation (29):

$$RC[\underline{y}_{ij}] = \frac{\text{Re}\left[Y_G^{in}[\underline{y}_{ij}]\right]}{\omega \text{Im}\left\{Y_G^{in}[\underline{y}_{ij}]\right\}}. \tag{34}$$

The stationary point is given by:

$$0 = \text{Im}\left\{\frac{\delta Y_G^{in}[\underline{y}_{ij}]}{Y_G^{in}[\underline{y}_{ij}]}\right\}. \tag{35}$$

Where the functional derivative of the generator input admittance is given by:

$$\delta Y_G^{in}[\underline{y}_{ij}] = \frac{\delta Y^{in}[\underline{y}_{ij}]}{\left(1 + \frac{Y^{in}[y_{ij}]}{Y^G}\right)^2}. \tag{36}$$

From which the full expression for the functional derivative of equation (35) can be derived for a two-terminal 305 interconnect 310 as:

$$\delta RC(r) = \frac{1}{\omega \text{Im}\{\underline{Y}_G^{in}\}} \text{Re}\left\{ \frac{\sum_{i,j\in\{a,b\}} \frac{\partial \underline{Y}^{in}}{\partial \underline{Y}_{ij}} \underline{y}_{ij}(r)}{\left(1 + \frac{\underline{Y}^{in}}{\underline{Y}^G}\right)^2} \right\} - \tag{37}$$

$$\frac{\text{Re}\{\underline{Y}_G^{in}\}}{\omega(\text{Im}\{\underline{Y}_G^{in}\})^2} \text{Im}\left\{ \frac{\sum_{i,j\in\{a,b\}} \frac{\partial \underline{Y}^{in}}{\partial \underline{Y}_{ij}} \underline{y}_{ij}(r)}{\left(1 + \frac{\underline{Y}^{in}}{\underline{Y}^G}\right)^2} \right\}$$

where:

$$\text{Re}\{\delta \underline{Y}^{in}\} = \tag{38}$$

$$\sum_{i,j\in\{a,b\}} \text{Re}\left\{\frac{\partial \underline{Y}^{in}}{\partial \underline{Y}_{ij}}\right\} \text{Re}\{\underline{y}_{ij}(r_0)\} - \sum_{i,j\in\{a,b\}} \text{Im}\left\{\frac{\partial \underline{Y}^{in}}{\partial \underline{Y}_{ij}}\right\} \text{Im}\{\underline{y}_{ij}(r_0)\}$$

and $$\text{Im}\{\delta \underline{Y}^{in}\} = \tag{39}$$

$$\sum_{i,j\in\{a,b\}} \text{Re}\left\{\frac{\partial \underline{Y}^{in}}{\partial \underline{Y}_{ij}}\right\} \text{Im}\{\underline{y}_{ij}(r_0)\} + \sum_{i,j\in\{a,b\}} \text{Im}\left\{\frac{\partial \underline{Y}^{in}}{\partial \underline{Y}_{ij}}\right\} \text{Re}\{\underline{y}_{ij}(r_0)\}.$$

From equations (37)-(39), the fixpoint expression can be defined for an arbitrary point $r_0$ on interface 311 as:

$$0 = \sum_{i,j\in\{a,b\}} \left( \frac{\text{Re}\left\{\frac{\partial \underline{Y}^{in}}{\partial \underline{Y}_{ij}}\right\}}{\text{Re}\left\{\underline{Y}^{in}\left(1 + \frac{\underline{Y}^{in}}{\underline{Y}^G}\right)\right\}} - \frac{\text{Im}\left\{\frac{\partial \underline{Y}^{in}}{\partial \underline{Y}_{ij}}\right\}}{\text{Im}\left\{\underline{Y}^{in}\left(1 + \frac{\underline{Y}^{in}}{\underline{Y}^G}\right)\right\}} \right) \text{Re}\{\underline{y}_{ij}(r_0)\} - \tag{40}$$

$$\sum_{i,j\in\{a,b\}} \left( \frac{\text{Im}\left\{\frac{\partial \underline{Y}^{in}}{\partial \underline{Y}_{ij}}\right\}}{\text{Re}\left\{\underline{Y}^{in}\left(1 + \frac{\underline{Y}^{in}}{\underline{Y}^G}\right)\right\}} + \frac{\text{Re}\left\{\frac{\partial \underline{Y}^{in}}{\partial \underline{Y}_{ij}}\right\}}{\text{Im}\left\{\underline{Y}^{in}\left(1 + \frac{\underline{Y}^{in}}{\underline{Y}^G}\right)\right\}} \right) \text{Im}\{\underline{y}_{ij}(r_0)\}.$$

Detailed Discussion of Arbitrary Fan-Out

Figure 8:
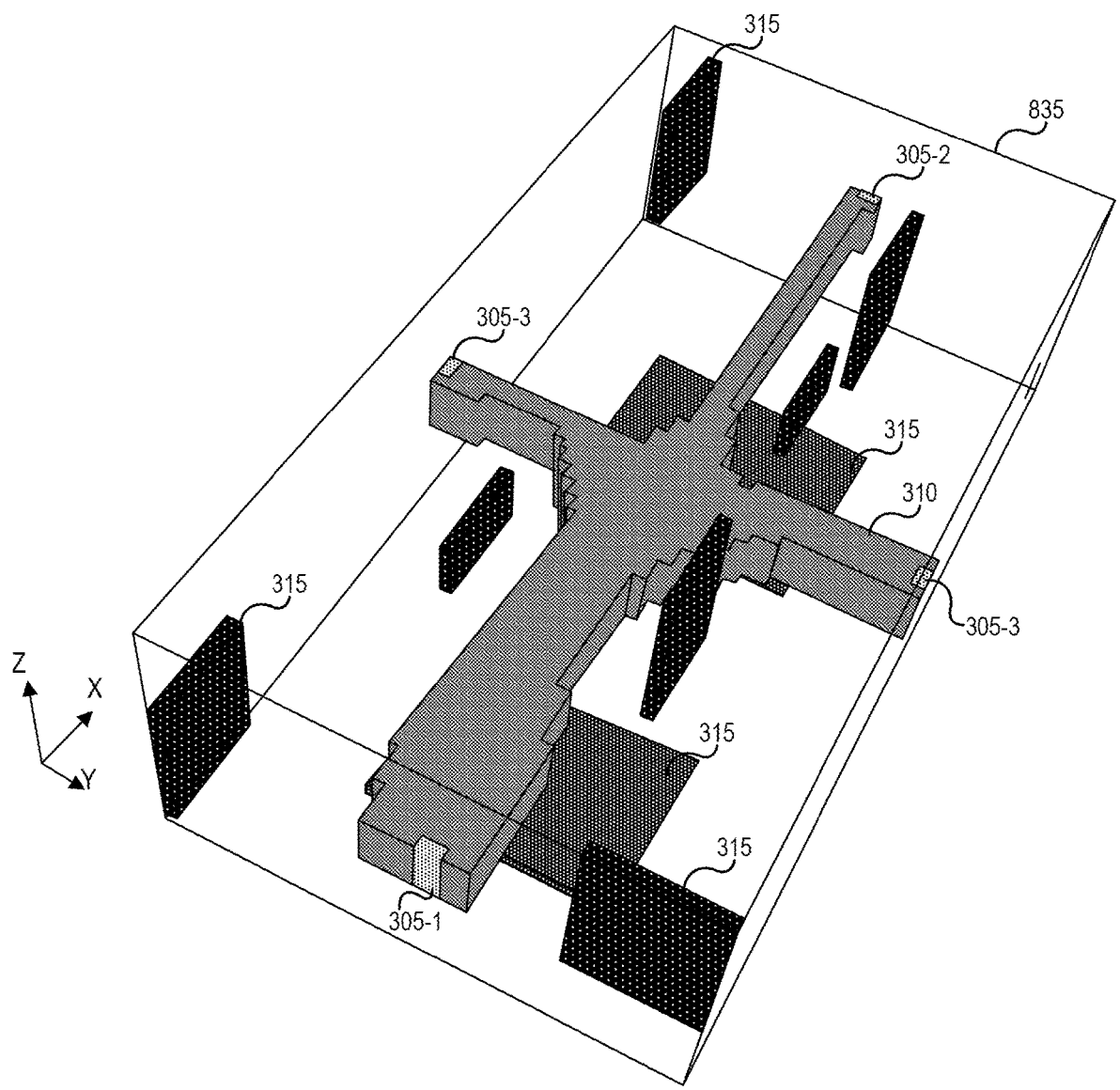
FIG. 8 is a schematic diagram illustrating an example three-dimensional representation of an updated layout file including a fan-out configuration, in accordance with embodiments of the present disclosure.

The derivation for the variation of the RC can be expanded for interconnects that couple a driver (input terminal 305) to multiple output terminals 305, as described in more detail in reference to FIG. 8. In the RC expression given derived in Equation (34), the output terminals 305 influence the value of the input admittance $\underline{Y}^{in}$ that forms a part of the generator input admittance. As such, RC and its variation for an arbitrary fanout can be determined at least in part by calculating the input admittance and its derivative with respect to different admittances.

To this end, consider an interconnect 310 with an input terminal 305 $a \in \{1, 2, \ldots, N\}$ that can be characterized by an N×N admittance matrix $\underline{\hat{Y}}$ as well as loads $$\underline{Y}_i^L$$

i for all i=1, 2, ..., N terminals 305. To determine the input admittance in this case, we start out with Ohm's law $I = \hat{\underline{Y}} V$, which uses a simplified notation but it is understood that both I and V refer to vectors of complex phasors. To compute the input admittance with respect to terminal 305 a, the impact of the loads on all ports but a can be determined. To this end, a reduced (N−1)×(N−1) matrix $\underline{\tilde{Y}}$ which is equal to $\underline{\hat{Y}}$ except the row and column corresponding to terminal 305 a are removed. Likewise the vectors $\tilde{I}$ and $\tilde{V}$ are defined as equal to I and V, respectively, but without the element a. In terms of $\underline{\hat{Y}}$, Ohm's law can be expressed as:

$$\tilde{I} = HV_a + \underline{\tilde{Y}}\tilde{V} = -\underline{\tilde{Y}}^L \tilde{V} \tag{41}$$

where $\underline{\tilde{Y}}^L$ is the (N−1)×(N−1) diagonal matrix with all loads except for terminal 305 a on its diagonal. Furthermore, H contains the elements H=( ..., $\underline{Y}_{ka}$, ... )$^T$, k∈{1, ..., N}\{a}.

Equation (41) can be simplified to an expression for a relationship between a voltage ratio (V$^r$) and H, as follows:

$$(\underline{\tilde{Y}} + \underline{\tilde{Y}}^L) V^r = -H \tag{42}$$

where V r=V$^\sim$/Va are voltage ratios with respect to the input.

Equation (42) can be used to determine the input admittance as a function of the voltage ratio and elements of the admittance matrix:

$$\underline{Y}^{in} = \underline{Y}_{aa} + \sum_{\ell \ne a} \underline{Y}_{n\ell} V_\ell^r. \tag{43}$$

Using these expressions, a linear system of equations can be defined and solved to define the derivative of the input admittance:

$$\frac{\partial \underline{Y}^{in}}{\partial \underline{Y}_{ij}} = \delta_{ia}\delta_{ja} + \sum_{\ell \ne a} \delta_{ia}\delta_{j\ell} V_\ell^r + \sum_{\ell \ne a} \underline{Y}_{a\ell} \frac{\partial V_\ell^f}{\partial \underline{Y}_{ij}}. \tag{44}$$

Detailed Discussion of Cell RC-Contributions

As described in more detail in reference to FIG. 2, the following discussion elaborates an illustrative example of a computational technique for optimizing RC for interconnects 310 of a layout file 170 including one or more nets. Starting from a fully routed layout 170 including N interconnects 310, each with a set of $T_n$ terminals 305, where n∈{1, 2, ..., N}. Moreover, each interconnect 310 n has one or more inputs originating from pull-up and/or pull-down networks, as well as one or more outputs terminating in a load (e.g., a gate in CMOS technology). The set of inputs to interconnect 310 n is denoted as $$T_n^{in}$$

and the set of output $$T_n^{out}$$

with $$T_n^{in} \cup T_n^{out} = T$$

describing the set of terminals 305 (e.g., a terminal 310 can couple inputs to outputs without dead or null terminals).

Shape optimization of interconnects 310 includes defining the local contribution $\delta RC(r)$ of each interconnect 310. When RC is minimal, it is stationary and the variation $\delta RC$ vanishes which occurs through a cancellation of its conductive component inside the interconnects and its capacitive component outside the interconnect, see the two terms in Eq. (40).

Detailed Discussion of Shape-Modification:

Consequently, if the interconnect is not RC-optimal, we can find an imbalance of the components at the interconnect interface, "$r_{inter}$." Denote the conductive contribution $$C_C^n(r)) = \delta RC(r)|_{inside}$$

the value of $\delta RC$ on the inside of the interconnect and the capacitive contribution $$C_C^n(r) = \delta RC(r)|_{outside}$$

on the outside of the interconnect. Then a heuristic to improve the RC is given by:

If $$C_C^n(r_{inter}) > C_G^n(r_{inter}),$$

decrease interconnect width.

If $$C_C^n(r_{inter}) < C_G^n(r_{inter}),$$

increase interconnect width.

If $$C_C^n(r_{inter}) = C_G^n(r_{inter}),$$

maintain interconnect width.

In the context of the heuristic described above, the equality can be understood to be approximate within a range of values. For example, If $$C_C^n(r_{inter})$$

is substantially equal to $$C_G^n(r_{inter})$$

within a given tolerance, the interconnect boundary 311 can be maintained. Similarly, if $$C_C^n(r_{inter})$$

is greater than $$C_G^n(r_{inter})$$

outside a given tolerance, the interconnect 310 width can be reduced. In some embodiments, the tolerance can be given as a ratio of the values of $$C_C^n(r_{inter}) \text{ and } C_G^n(r_{inter}).$$

For example, a ratio of $$C_C^n(r_{inter}) \text{ to } C_G^n(r_{inter})$$

of about 1.5 or less, about 1.4 or less, about 1.3 or less, about 1.2 or less, about 1.1 or less, about 1.05 or less, about 1.01 or less, including interpolations and fractions thereof, can be considered equal within the tolerance.

Implementing the algorithm is complicated by geometric dependence of local modifications to interconnect boundary 311 on values of $$C_c^n(r_{inter})$$

and $$C_G^n(r_{inter})$$

in a boundary region 313 near the interconnect boundary 311. As described in more detail in reference to FIG. 7, assigning a material to a cell in three-dimensional representation 235 can include determining a differential contributions of cells in a discretized space and comparing corresponding contributions of neighboring discretization volumes (e.g., cells) in boundary region 313.

In some embodiments, the relative influence of conducting and dielectric materials in boundary region 313 on the differential RC contribution at a given position r of interconnect 310 can be accounted for by extrapolating values for $$C_c^n$$

and $$C_G^n$$

into neighboring cells of three-dimensional representation 235. In some embodiments, extrapolation can include applying a three-dimensional smoothing operation to cells. An example of three-dimensional smoothing includes a gaussian smoothing function, defined as $$\mathcal{G}_\sigma(r) = \frac{1}{\sqrt{2\pi}^3 \sigma_x \sigma_y \sigma_z} \exp\left(-\frac{x}{2\sigma_x} - \frac{y}{2\sigma_y} - \frac{z}{2\sigma_z}\right) \quad (45)$$

where σ is a three dimensional standard deviation vector of values, $\sigma=(\sigma_x, \sigma_y, \sigma_z)$ defined in cartesian space. It is understood that σ can be defined in other coordinate spaces to correspond to the coordinate space used to define three-dimensional representation 235. The value of σ influences the range of smoothing, with a smaller value resulting in more restricted smoothing and a larger value resulting in broader smoothing. In some embodiments, to limit the potential for opposing boundaries 311 to affect field contributions, which are vector quantities, the value of σ can be smaller than a width $X_W(Y)$ of interconnect 310. In this way, σ can be a function of position in three-dimensional representation 235 or can be a consistent value for layout 170. In some embodiments, an initial value of σ is selected as greater than an initial width of interconnect 310 (e.g., in rectilinear routing the width can be a single value).

In the case of gaussian smoothing function of equation (45), smoothed contributions to conductance and capacitance at a given position r can be expressed as three-dimensional convolutions:

$$\tilde{C}_G^n(r) := (C_G^n * \mathcal{G}_\sigma)(r) \tag{46}$$
$$\tilde{C}_C^n(r) := (C_C^n * \mathcal{G}_\sigma)(r)$$

Where $$\tilde{C}_C^n(r)$$

and $$\tilde{C}_G^n(r)$$

represent the smoothed capacitive contribution and the smoothed conductive contribution at a position r in three-dimensional representation 235, respectively. Advantageously, extrapolation, such as through smoothing as described in equation (45) and equation (46) permits the relative contribution of a cell to conductance and capacitance of interconnect 310 (e.g., real and imaginary components of RC) to be determined with less influence of the relative position of a cell to interconnect boundary 311. In this way, for a position r that is in interconnect 310, where $$\tilde{C}_C^n(r) > \tilde{C}_G^n(r) + \varepsilon,$$

within a given tolerance ε, the material can be reassigned from a conductor to a dielectric (e.g., from a metal to an oxide). Otherwise, the material of interconnect 310 in the corresponding cell to position r can be maintained as a conductor. Similarly, for a position r that is outside interconnect 310, where $$\tilde{C}_G^n(r) > \tilde{C}_C^n(r) + \varepsilon,$$

within a given tolerance ε, the material can be reassigned from a dielectric to a conductor (e.g., from an oxide to a metal). Otherwise, the material of interconnect 310 in the corresponding cell to position r can be maintained as a dielectric.

In some embodiments, the simulation mesh is unstructured and instead of reassigning materials to cells, we can move the interconnect walls via a mesh movement operation.

Figure 7:
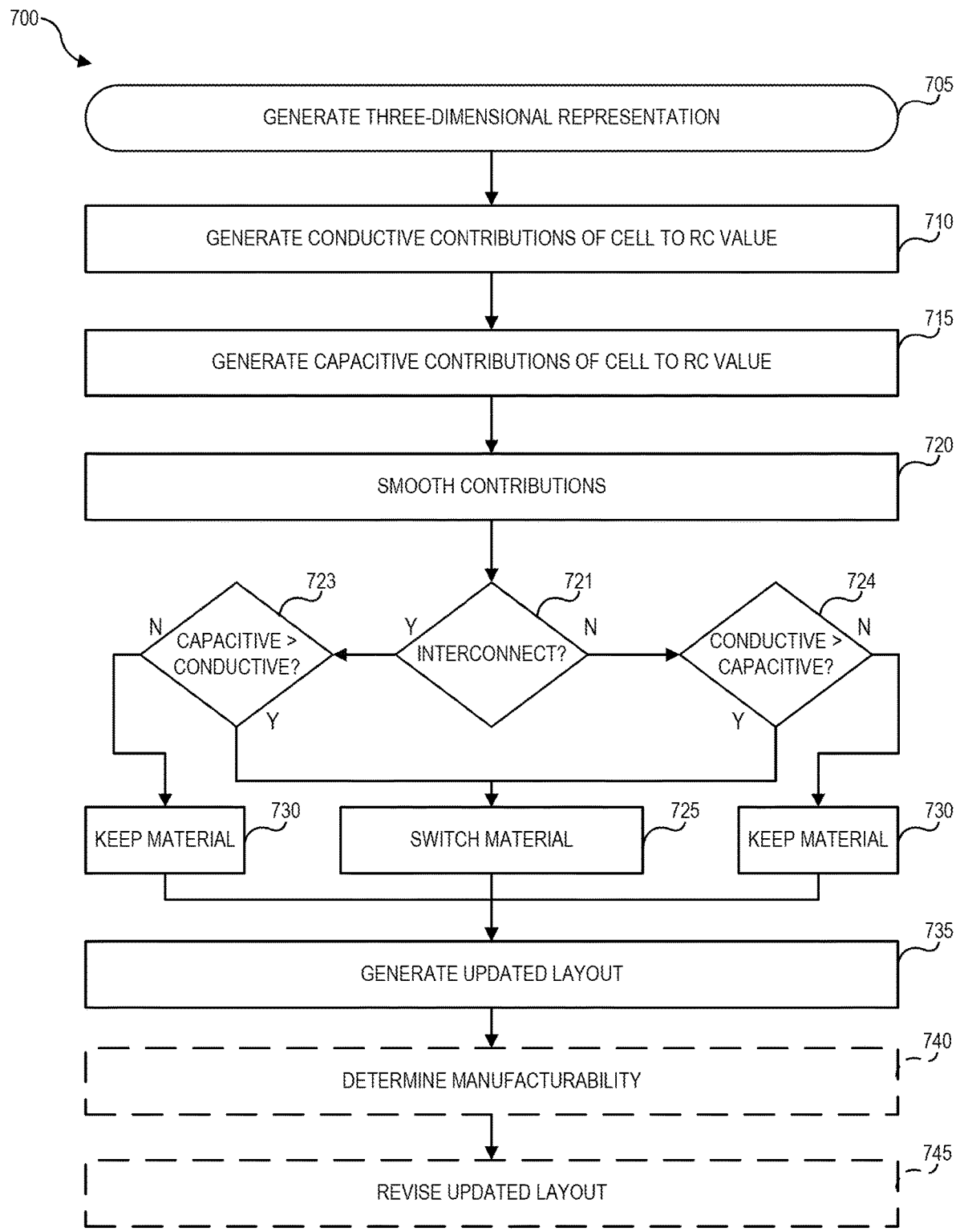
FIG. 7 is a block diagram illustrating an example flow of operations applied to three-dimensional representation, as part of example process of FIG. 2, in accordance with embodiments of the present disclosure.

As described in more detail in reference to FIG. 7, in some embodiments, a manufacturability check can be included as part of the operations of example process 200, including but not limited to generating updated layout 270. Where a process function P (M, θ) is available that depends on a maskset M and fab parameters θ, material parameter fields describing the interconnect(s) 310 can be determined. With an interconnect 310 structure with a given $M_0$ and θ, the material parameters and other interesting quantities of the interconnect 310 structure can be determined using the process function $P(M_0, \theta) = \{\sigma(r), \varepsilon(r), \ldots\} =: S_0$, where the wafer state $S_0$ of the initial iteration 0 is defined as the set of physical quantities describing layout 170. With the approach described above, admittances of interconnect(s) 310 can be determined, and from generator and load admittances, smoothed contributions can be determined for interconnect(s) 310.

With updated layout 270, a target design $D_1$ can be defined as the next iteration (e.g., iteration 1, after initial state 0) that includes updated material parameters for cells making up three-dimensional representation 235. With process data describing fab parameters θ a process simulation can be implemented to simulate the manufactured result of $D_1$, which can be used to modify $D_1$ into a new wafer state $S_1$. In some embodiments, D1 can be manufacturable based on physical simulations while also violating Boolean design rules for the process. In this way, manufacturability check described here can be directed at retention of function, rather than satisfying manufacturer-provided design rules that can be developed to minimize other figures of merit, such as edge-placement-error, that are based on rectilinear routing but are less applicable to curvilinear routing.

Over one or more iterations ("i") of the operations described above, the RC value of wafer state $S_i$ can converge to an optimum that is also manufacturable based on physically meaningful process simulations. Advantageously, manufacturability validation based at least in part on process data can provide a differentiable manufacturability revision, where a small change in the design D will lead to lead to a small change in the wafer state S. In contrast Boolean design rules are not smooth or differentiable, and do not permit the gradient-based optimization techniques described above to include manufacturability-based revision of updated layout 270.

An exemplary algorithm for implementing the optimization described above to take in a maskset $M_{IN}$ and process data θ and output a revised maskset $M_{OUT}$, described in more detail in reference to FIG. 7 for a layout file 170, includes the following operations, which can be parallelized or otherwise reordered:

1. Compute wafer state $S_0$ using a process model ("P").
2. Compute the net contributions $$C_C^n(r)$$

and $$C_G^n(r)$$

for the wafer state $S_i$ for interconnect(s) 310 using Equation (37).

3. Compute the Gaussian smoothing $$\tilde{C}_C^n(r)$$

and $$\tilde{C}_G^n(r)$$

of Eq. (46) for interconnect(s) 310.
4. Generate a new target design $D_{i+1}$ using the heuristic described above.
5. Compute a maskset $M_{i+1}$ that is manufacturable while being closest to $D_{i+1}$ at least in part using a process simulation $P(D_{i+1}, \theta)$.
6. Compute a new wafer state $S_{i+1}$ using $P(Mi+1, \theta)=Si+1$.
7. Compute an optimization objective (e.g., an RC value) using the new wafer state $S_{i+1}$. Where the optimization objective value does not satisfy a target value or criterion (e.g., a delta or convergence metric), increment i and return to step 2.
8. With convergence, return the final maskset $M_F$.

FIGS. 4A-4D are schematic diagrams illustrating two-dimensional plan projections onto an "x-y" plane of three-dimensional representations 235 of portions of layout files 170 and updated layouts 270, in accordance with embodiments of the present disclosure. The projections represent a two-port interconnect as described in more detail in reference to FIGS. 3A-3B, to which a shape optimization including one or more iterations can be and/or have been completed, as described in reference to FIG. 2 and FIGS. 3A-3B. In this way, FIGS. 4A-4D are provided to illustrate the influence of layer information 225 and terminal information 220 on shape optimization and updated layout(s) 225. While representative of exemplary simulation and optimization results, FIGS. 4A-4D are not intended to be limiting, but rather illustrative. For example, the result of shape optimization may differ from the examples provided in FIGS. 4B-4D, based at least in part on the layer information 225, terminal information 220, and layout file 170 used to generate three-dimensional representation 235. Additionally or alternatively, the characteristic metric used to guide shape optimization can also influence the result of shape optimization, as can the inclusion of physical effects, such as dielectric breakdown or other field-effects that can become significant at small length-scales on the order of nanometers or less. In this way, an optimization with the same layout file 170, same layer information 225, and same terminal information 220 can result in a different modified layout 225 than those illustrated. Advantageously, realistic interconnect structures can include layer-specific material parameters for each of multiple layers. Additionally, physical parameters, such as conductivity can vary within a single interconnect 310, for example, as a function of wall-distance. Such variations are straightforwardly captured by the techniques described herein, but introduce significant complexity for rule-based systems that can include adding new rules-based models for each layer and each interconnect 310.

Figure 4A:
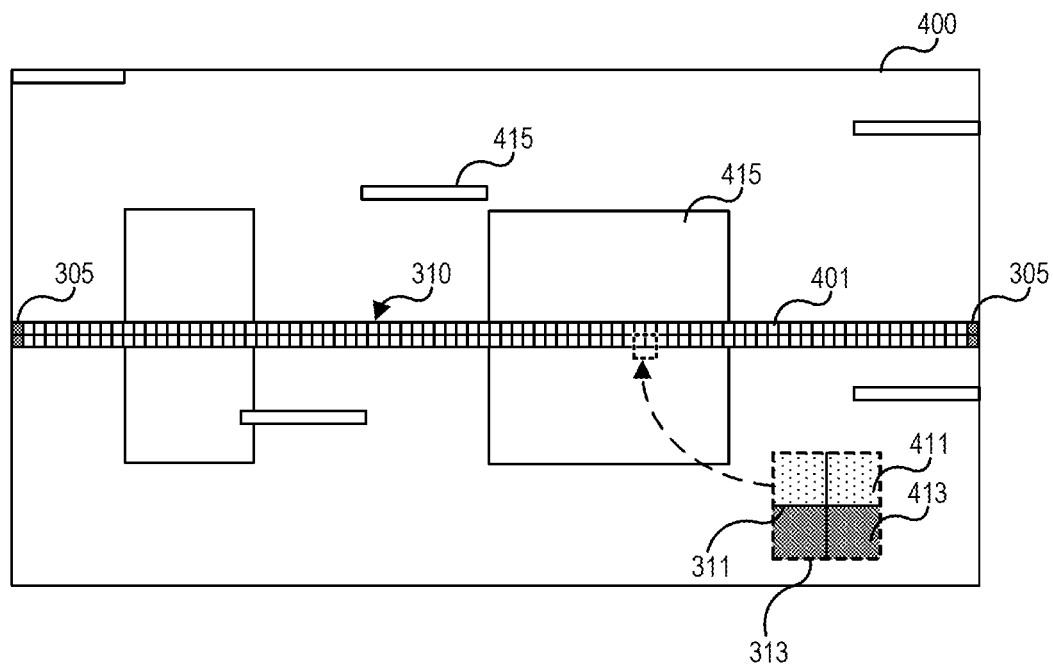
FIG. 4A is a schematic diagram illustrating an example plan of a simplified three-dimensional representation of at least a portion of a layout file describing an interconnect coupling two terminals (e.g., a two-port interconnect), in accordance with embodiments of the present disclosure.

FIG. 4A is a schematic diagram illustrating an example plan 400 of a simplified three-dimensional representation 235 of at least a portion of a layout file 170 describing an interconnect 310 coupling two terminals 305 (e.g., a two-port interconnect), in accordance with embodiments of the present disclosure. Example plan 400 also includes additional conducting features 415, including but not limited to a conducting backplate, vias or other terminals not coupled with interconnect 310. As described in more detail in reference to FIG. 2, three-dimensional representation(s) 235 define cells 401 for interconnect 310, terminals 305, conducting elements 415, and dielectric materials surrounding interconnect 310. As described in more detail in reference to FIGS. 3A-3B, boundary region 313 near a surface of interconnect 310 can be modified as part of shape optimization. While example plan 400 omits cells 401 for dielectric materials in the interest of visual clarity, boundary region 313 is illustrated in an inset with conducting cells 411 of interconnect 310 and dielectric cells 413 outside interconnect 310 (e.g., corresponding to an oxide or nitride material). Accompanying layout file 170 that was used to generate three-dimensional representation, layer information 225 is used to identify conducting cells 411 and dielectric cells 413, based on spatial information from layout file 170.

While example plan 400 conforms to rectilinear routing conventions, a characteristic metric including but not limited to the RC time constant for interconnect 310, can indicate that interconnect 310 can be sub-optimal in terms of its shape. For example, electromagnetic interaction between interconnect 310 and one or more conducting elements 415 can increase the RC time constant for a given set of terminal information 220. As part of reshaping interconnect 310, terminal information 220 can be used with three-dimensional representation 235 of example plan 400 to determine individual contributions of cells 401, such as cells 401 near boundary region 313, to the RC value of interconnect under the particular operating conditions defined in terminal information 220. In this way, different terminal information 220 can result in different updated layouts 270, as described in more detail in reference to FIGS. 4B-4D.

Figure 4B:
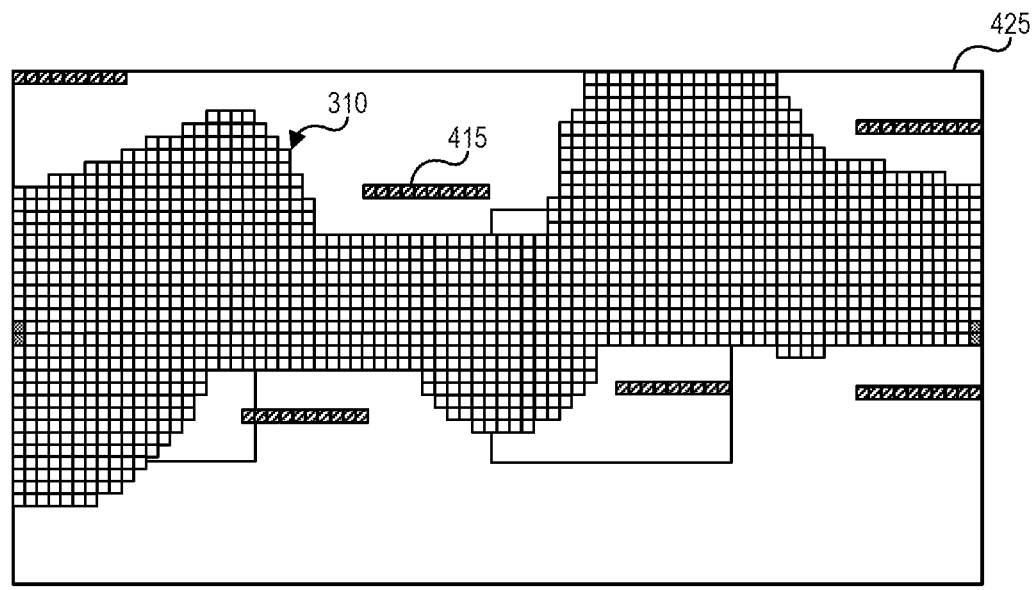
FIG. 4B is an example plan of an updated layout generated from an example plan of FIG. 4A in accordance with a first set of terminal information, in accordance with embodiments of the present disclosure.

FIG. 4B is an example plan 425 of an updated layout 270 generated from example plan 400 of FIG. 4A in accordance with a first set of terminal information 220, in accordance with embodiments of the present disclosure. Without being bound to a particular set of terminal information 220 and layer information 225, example plan 425 represents an output of one or more iterations of example process 200 using example plan 400 as an input to physical simulation module 143.

Example plan 425 corresponds to an embodiment of example process 200 where terminal information 220 includes an input frequency, a driver impedance, and a load capacitance. In the interest of simplicity, particular values are omitted to focus on description of the relative influence of constituent parameters of terminal information 220. In practice, it is understood that terminal information can include values for parameters corresponding to those used during integrated circuit operation. For example, driver impedance can be or include a value of about zero Ohms or greater, about 10 Ohms or greater, about 100 Ohms or greater, about 1000 Ohms or greater, about 5000 Ohms or greater, about 10,000 Ohms or greater, about 100,000 Ohms or greater, about 1,000,000 Ohms or greater, or about 10,000,000 Ohms or greater, including fractions and interpolations thereof. Similarly, input frequency can be or include frequencies in the kHz range, the MHz range, or the GHz range, including fractions and interpolations thereof. Similarly, load capacitance can be or include a value of about 0.0001 fF or greater, about 0.001 fF or greater, about 0.01 fF or greater, about 0.1 fF or greater, about 1.0 fF or greater, about 10 fF or greater, or about 100 fF or greater, including fractions and interpolations thereof. In an illustrative example, example plan 425 can correspond with terminal information specifying a driver impedance of about 1M Ohm, a load capacitance of about 1 fF, and an input frequency of about 100 GHz.

As illustrated in FIG. 4B, the shape of interconnect 310 is significantly different in example plan 425 as compared to the rectilinear shape of interconnect 310 in example plan 400. In particular, the width of interconnect 310 is greater, with a nonuniform widening of interconnect 310 applied as a function of lateral position relative to terminals 305. As described in reference to FIGS. 2-3B, the position-dependent width ("$X_W(Y)$") of interconnect 310 is determined using contributions of cells 405 to capacitive and conductive terms of the RC time constant for interconnect 310. Without being bound to a particular physical phenomenon, the shape of interconnect 310 of updated layout 270 illustrated in example plan 425 is understood to indicate a contribution of capacitance that is greater than a contribution of conductance to an RC value for interconnect 310.

Advantageously, the techniques described herein permit example system 100 to generate updated layout 270 corresponding to example plan 425 by one or more iterations of example process 200 using physically meaningful information, rather than a physics-naïve heuristic. For example, it may appear that example plan 425 could be generated by a rules-based model directed to widen interconnect 310 while maintaining a minimum distance between interconnect 310 and conducting elements 415. Such a physics-naïve model, however, would not produce updated layout 270 that results in an optimized RC value for terminal information 220 and layer information 225.

As described in more detail in reference to FIG. 1, however, physics-simulation module 143 can be augmented with one or more machine learning models 144 that are trained to reshape at least a portion of interconnect 310. For example, a convolutional neural network can be trained to accept layout file 170 or three-dimensional representation 235 as an input with terminal information 220 and/or layer information 225 and to output a reshaped interconnect 310. The output of machine learning model(s) 144 can be or include a material identifier of one or more cells 401, a portion of interface 311, or the like. Unlike a physics-naïve rules-based model, machine learning model(s) 144 can be trained for a specific set of terminal information 220 and/or layer information 125, for example, using a labeled training set of rectilinear layout files 170 and updated layouts 270 (e.g., as an approach to supervised training). In this way, machine learning model(s) 144 can approximate the physical simulations described in reference to FIGS. 3A-3B.

Figure 4C:
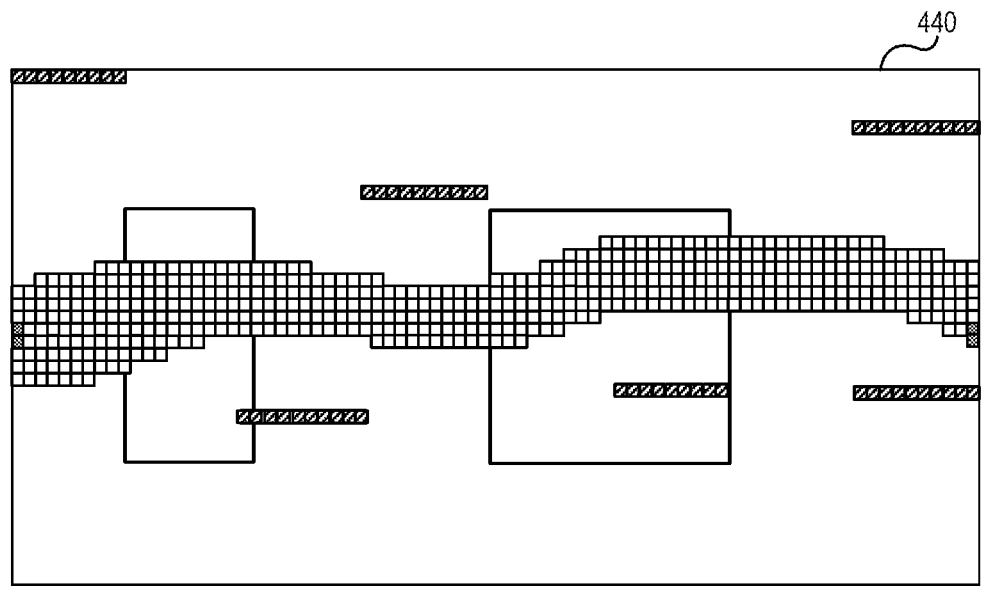
FIG. 4C is another example plan of an updated layout generated from example plan of FIG. 4A using a second set of terminal information, in accordance with embodiments of the present disclosure.

FIG. 4C is another example plan 450 of an updated layout 270 generated from example plan 400 of FIG. 4A using a second set of terminal information 220, in accordance with embodiments of the present disclosure. As with example plan 425 of FIG. 4B, example plan 450 is generated by the operations of example process 200 of FIG. 2, as described in more detail in reference to FIGS. 3A-3B. In comparison to example plan 425, example plan 450 includes a relatively narrower interconnect, with a wider spacing between interconnect surface 311 and conducting elements 415. Example plan 450 illustrates the effect of different terminal information 220 on shape modification of interconnect(s) 310, based at least in part on operating parameters of terminals 305 and interconnect 310, such as driver impedance, load capacitance, or frequency. In the example of FIG. 4C, driver impedance is a relatively higher number than the corresponding driver impedance used to generate example plan 425. From this, it is seen that with increasing impedance, conductive contributions of interconnect cells 401 decrease relative to capacitive contributions of neighboring cells 401 in boundary region 313, resulting in a relatively narrower interconnect 310. It is noted, however, that interconnect 310 of example plan 450 is widened relative to interconnect 310 of example plan 400, indicating that a rectilinear "shortest path" route that is typical of conventional routing algorithms is not optimized for RC time constant. This, in turn, indicates that imposing a rectilinear routing convention can result in performance impairment for integrated circuits that scales with the number of interconnects.

Figure 4D:
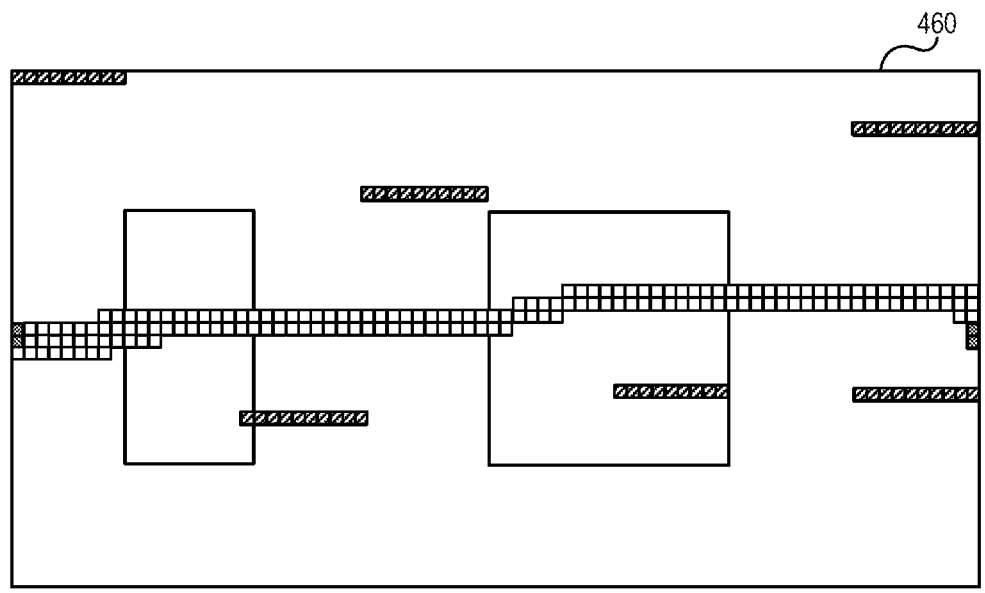
FIG. 4D is another example plan of an updated layout generated from example plan of FIG. 4A using a third set of terminal information, in accordance with embodiments of the present disclosure.

FIG. 4D is an example plan 460 of an updated layout 270 generated from example plan 400 of FIG. 4A in accordance with a third set of terminal information 220, in accordance with embodiments of the present disclosure.

As with example plan 425 of FIG. 4B and example plan 450 of FIG. 4C, example plan 460 is generated by the operations of example process 200 of FIG. 2, as described in more detail in reference to FIGS. 3A-3B. In comparison to example plan 425, example plan 460 includes a relatively narrower interconnect, with a wider spacing between interconnect surface 311 and conducting elements 415. Example plan 460 illustrates the effect of different terminal information 220 on shape modification of interconnect(s) 310, based at least in part on operating parameters of terminals 305 and interconnect 310, such as driver impedance, load capacitance, or frequency. In the example of FIG. 4C, driver impedance is a relatively higher number than the corresponding driver impedance used to generate example plan 425. From this, it is seen that with increasing impedance, conductive contributions of interconnect cells 401 decrease relative to capacitive contributions of neighboring cells 401 in boundary region 313, resulting in a relatively narrower interconnect 310.

It is noted that interconnect 310 of example plan 460 is substantially the same width as interconnect 310 of example plan 400, except that the position of interconnect 310 cells 401, and thus interface 311, is repositioned relative to the positions of terminals 305. From this, it is demonstrated that reshaping interconnect 310 as part of example process 200 can include translating, displacing, and/or redirecting, interconnect 310 relative to one or more conducting elements 415 in layout file 170, as well as widening or narrowing interconnect width 310.

Figure 5A:
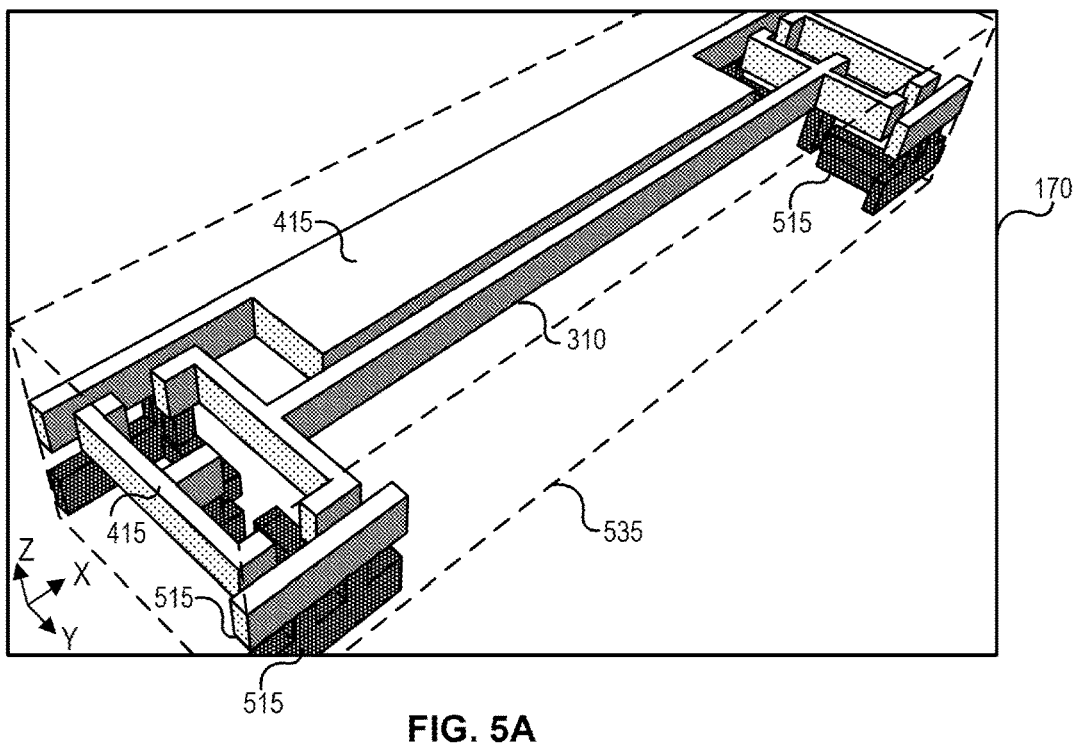
FIG. 5A is a schematic diagram illustrating an example three-dimensional representation of a layout file, in accordance with embodiments of the present disclosure.
Figure 5B:
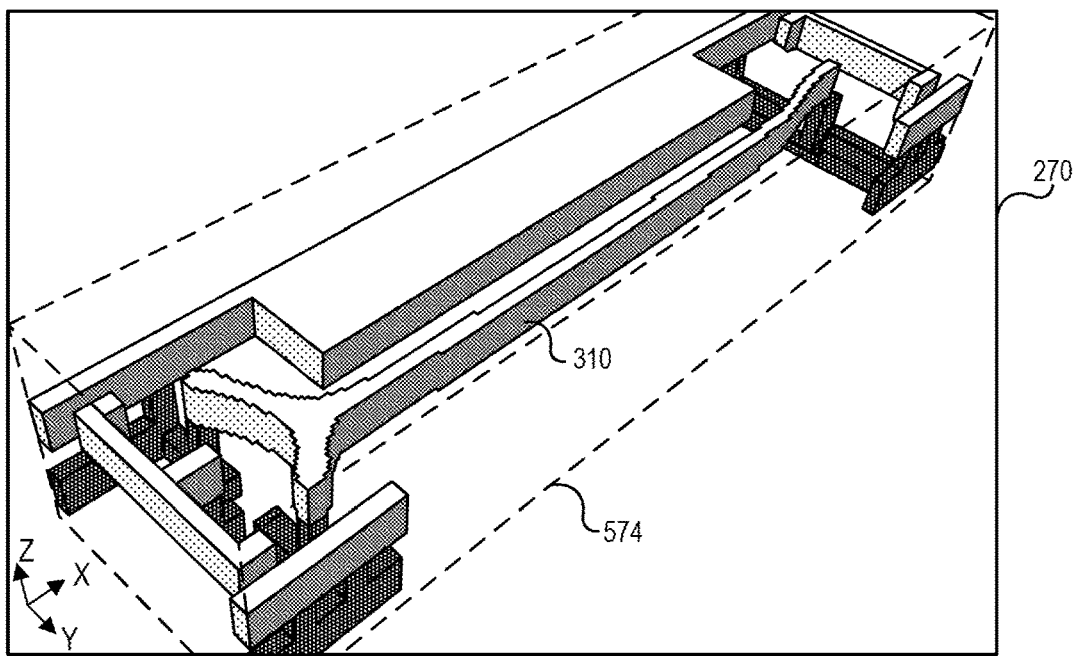
FIG. 5B is a schematic diagram illustrating an example three-dimensional representation of an updated layout, in accordance with embodiments of the present disclosure.

FIGS. 5A-5B are schematic diagrams illustrating example three-dimensional representations 535 of a layout file 170 and an updated layout 270, respectively. As illustrated, three-dimensional representations 235, including example three-dimensional representation 535, include three-dimensional information that is discretized into cells 401, assigned material properties using layer information 225. Elements of layout file 170 can be on different three-dimensional positions, labeled using cartesian "x," "y," and "z" axes in FIGS. 5A-5B. In some embodiments, optimization of interconnect 310 can be restricted to interconnect 310 or can include terminals 305 as well. Similarly, one or more interfaces 311 can be constrained as part of operations of example process 200. In this way, shape modification of interconnect 310 can be guided away from non-physical solutions.

FIG. 5A is a schematic diagram illustrating an example three-dimensional representation 235 of layout file 170, in accordance with embodiments of the present disclosure. Layout file 170 includes interconnect 310, terminals 305, conducting elements 415 at substantially the same "z" position as interconnect 310, and additional conducting elements 515 at different "z" positions than interconnect 310. In some embodiments, conducting elements 515 can be or include terminals 305. Layout file 170 represents an exemplary input to example process 200. As such, interconnect 310, conducting elements 515, and conducting elements 415 conform to rectilinear routing conventions. It is understood that three-dimensional representation 235 is discretized into cells 501, where rectilinear routing permits each interface 311 of interconnect 310 to be represented as a smooth unitary surface, in contrast to the quantized curvilinear interfaces 311 illustrated in FIG. 5B.

FIG. 5B is a schematic diagram illustrating an example three-dimensional representation 575 of updated layout file 270, in accordance with embodiments of the present disclosure. Example three-dimensional representation 575 represents an optimized interconnect 310 that is reshaped in accordance with example process 200, as described in more detail in reference to FIG. 2. As previously stated, one or more interfaces 311 of interconnect 310 can be constrained, such that interconnect 310 is reshaped while maintaining at least some of the electrical contacts to conducting elements 515 while improving RC as described in more detail in reference to FIGS. 3A-3B. In the context of FIGS. 3A-3B, FIG. 5B illustrates that a physics-based shape modification of interconnect 310 can result in a curvilinear interconnect 310 that is widened at one or more positions, narrowed at one or more positions, redirected, translated, displaced, or otherwise transformed, based at least in part on electromagnetic field simulations describing interactions between interconnect 310 and conducting elements 415 or conducting elements 515. As described in more detail in reference to FIGS. 4A-4D, the final shape of interconnect 310 is based at least in part on terminal information 220 and material information 225, such that the shape of interconnect illustrated in FIG. 5B is intended as an example, rather than a limiting embodiment. In some embodiments, differences in terminal information 220 and/or layer information 225 can result in a different shape modification in example three-dimensional representation 575.

Figure 6A:
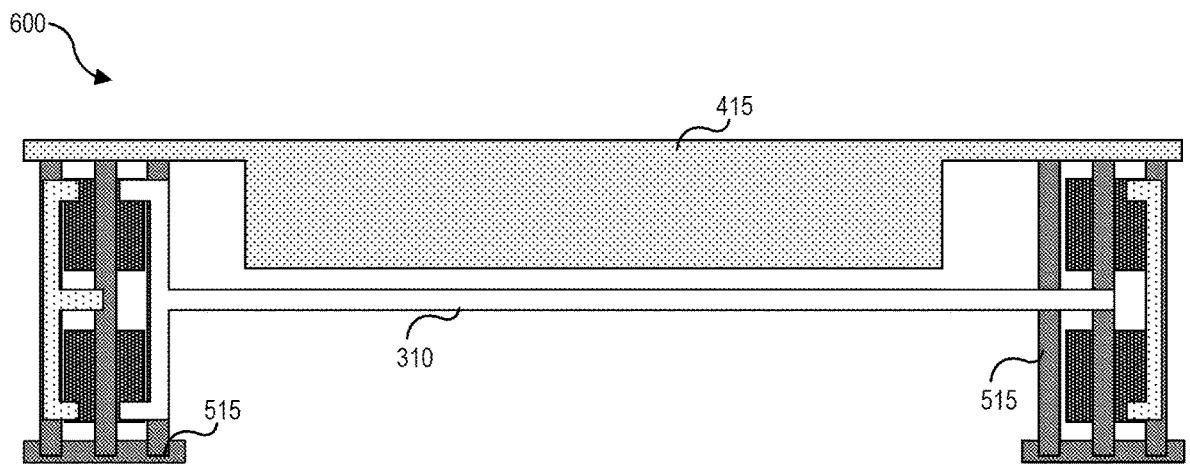
FIG. 6A is a schematic diagram illustrating an example plan of a layout file, in accordance with embodiments of the present disclosure.
Figure 6B:
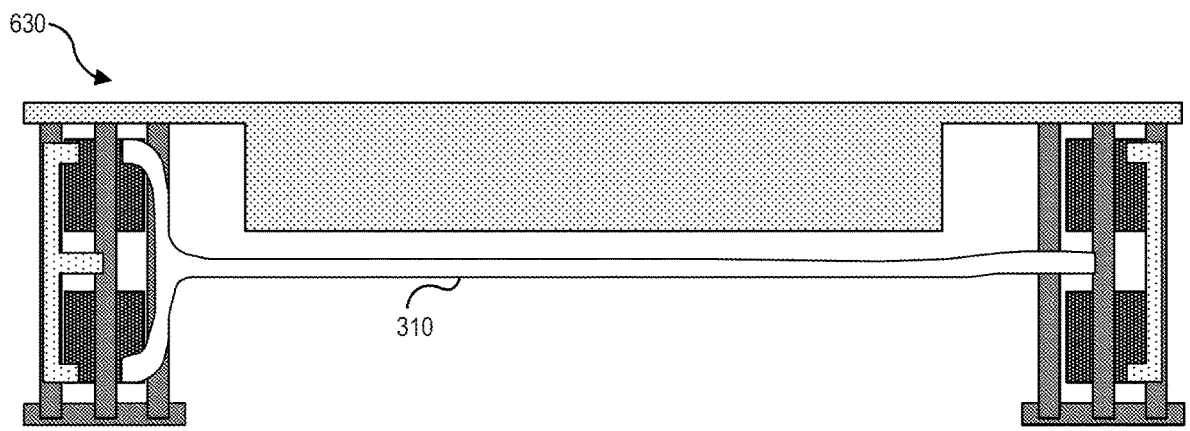
FIG. 6B is a schematic diagram illustrating an example plan of an updated layout in an intermediate state, in accordance with embodiments of the present disclosure.
Figure 6C:
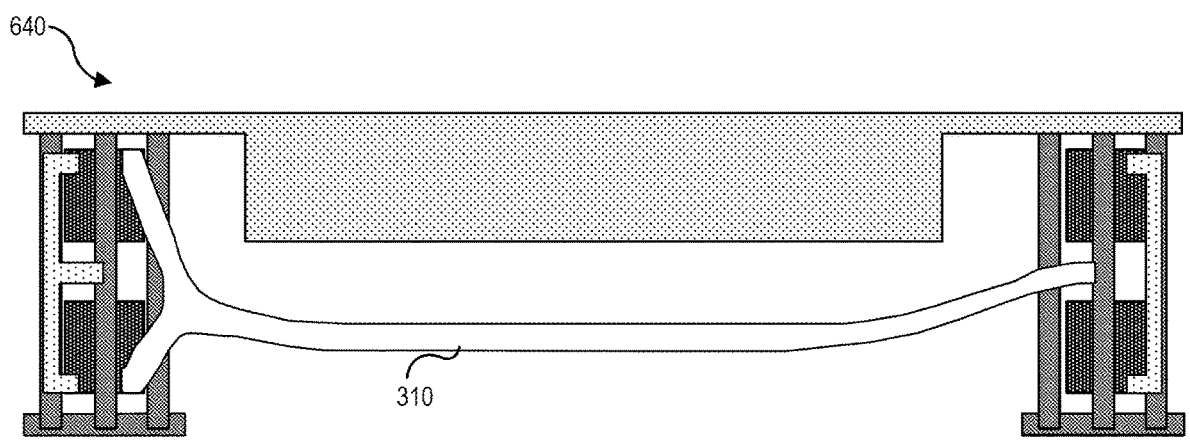
FIG. 6C is a schematic diagram illustrating an example plan of an updated layout in an advanced state, in accordance with embodiments of the present disclosure.

FIGS. 6A-6C are schematic diagrams illustrating example plans of layout file 170 and updated layouts 270 for intermediate and final iterations of example process 200, respectively. FIGS. 6A-6C are provided to illustrate progressive shape modification of interconnect 310 over multiple iterations of example process 200, as described in more detail in reference to FIG. 2.

FIG. 6A is a schematic diagram illustrating example plan 600 of layout file 170, in accordance with embodiments of the present disclosure. Example plan 600 corresponds to example three-dimensional representation 535 of FIG. 5A, which has been projected onto an "x-y" plane at a "z" position of interconnect 310, to ease visual interpretation. Example plan 600 illustrates that interconnect 315, conducting elements 415 and conducting elements 515 conform to rectilinear routing conventions, in accordance with the layout-file 170 being received following routing but preceding an initial iteration of example process 200. In some embodiments, however, layout file 170 is received following at least one iteration of example process 200. For example, updated layout 270 can be encoded as a layout file 170 and stored in third database 165. An example of such a process can include a circumstance where a first set of one or more iterations of example process 200 is completed, following which updated layout 270 is stored as a layout file 170, to be accessed for additional iterations of example process 200 if indicated.

FIG. 6B is a schematic diagram illustrating example plan 630 of updated layout 270 in an intermediate state, in accordance with embodiments of the present disclosure. Example plan 630 represents an "x-y" projection of three-dimensional representation 235 after one or more iterations of example process 200 has applied one or more shape modifications to interconnect 310, relative to example plan 600. As illustrated, interconnect 310 no longer conforms to rectilinear routing conventions, but rather includes one or more curvilinear surfaces. While three-dimensional representations 235 are discretized into cells 401, FIG. 6B includes smoothed interfaces 311 for ease of visual interpretation, although in some embodiments three dimensional representation 235 can be smoothed as part of generating updated layout 270 (e.g., a smoothed updated layout 270 can be used to generate masks that are sent so manufacturing system(s) 115). From the shape of interconnect 310, one or more shape constraints are visible, in that interconnect 310 is constrained to maintain contact with conducting elements 515 at one or more positions, corresponding to contact points with terminals 305. While interconnect 310 is shown with three contact points, it is understood that interconnect 310 can represent a "two-port" configuration described in the context of FIGS. 3A-3B.

FIG. 6C is a schematic diagram illustrating example plan 650 of updated layout 270 in an advanced state, in accordance with embodiments of the present disclosure. Example plan 650 represents an "x-y" projection of three-dimensional representation 235 after one or more additional iterations of example process 200 has applied one or more shape modifications to interconnect 310, relative to example plan 630 of FIG. 6B. Example plan 650 illustrates multiple shape modifications to interconnect 310 to (i) increase a distance between interconnect 310 and conducting elements 415, (ii) constrain interconnect 310 to maintain contact with terminals 305, and (iii) incorporate local width "$W_X(Y)$" variation as a function of lateral position on interconnect 310 in accordance with local contributions of cells 401 to an RC time constant based at least in part on terminal information 220 and layer information 225. In some embodiments, example plan 650 is a result of iterations applied to an updated layout 270. In some embodiments, example plan 650 is generated from operations applied to three-dimensional representations 235 prior to generating updated layout 270. In this way, heuristics described in reference to FIGS. 3A-3B can be applied to a three-dimensional representation 235, for example, by reassigning material property information of one or more cells 401.

FIG. 7 is a block diagram illustrating an example flow 700 of operations applied to three-dimensional representation, as part of example process 200 of FIG. 2, in accordance with embodiments of the present disclosure. As with the constituent operations of example process 200, example flow 700 represents operations that can be implemented by a computer system (e.g., server(s) 105, client computing device(s) 110, etc.) locally and/or in a distributed manner. As such, the constituent blocks of example flow 700 can be understood to represent machine-readable instructions encoded in software (e.g., software 155 of FIG. 1) that permit the computer system to modify the shape of interconnect 310, terminal(s) 305, etc, as part of a physics-based optimization of layout file 170 that can introduce curvilinear features to routed elements of layout file 170. While the constituent blocks of example flow 700 are represented as proceeding in a sequence, it is understood that one or more blocks can be omitted, repeated, reordered, or sub-divided, as part of iteration of example process 200 and/or implementation on a particular computer system. For example, in the context of a distributed system, a block can be subdivided into multiple constituent processes to facilitate parallelization. In this way, two or more blocks can be executed in parallel, rather than in sequence.

At block 705, example flow 700 includes generating three-dimensional representation 235, which corresponds to operation 207 of example process 200. Operations 201-205 of example process 200 are omitted from example flow 700 to focus description on constituent elements of operations 207-211. As described in more detail in reference to FIG. 2, block 705 can include discretizing layout file 170 or modified layout 270 to generate three-dimensional representation 235.

At blocks 710-715, example flow 700 includes generating conductive contributions of at least a subset of cells 401 of three-dimensional representation 235 to an RC time constant of interconnect 310. As described in more detail in reference to FIG. 3A-3B, in some cases contributions for at least a portion of cells 401 of three-dimensional representation 235 can be neglected, for example, where the portion of cells 401 are relatively far from interface 311 such that a reassignment of material information is unlikely. Detailed physical simulation information for determining individual contributions $C_C''(r)$ and $C_G''(r)$ is discussed in reference to FIGS. 3A-3B, above.

At block 720, one or more smoothing operations are applied on a cell-wise basis to contributions generated at blocks 710-715. Smoothing operations can be or include three-dimensional smoothing functions, such as a gaussian smoothing function with a standard deviation parameter $\sigma$. As described in more detail in reference to FIG. 3B, smoothing permits relative contributions of neighboring cells 401 to be extrapolated and thereby facilitates the heuristic for determining material reassignment described in reference to blocks 721-730, which can be implemented on a cell-wise basis.

At decision block 721, for a given cell 401, the position of the given cell 401 in three-dimensional representation 235 and/or the material property metadata for the given cell 401 are used to determine whether the given cell 401 forms a part of interconnect 310 or of the surrounding oxide. In some embodiments, cells 401 corresponding to terminals 305 and/or conducting elements 415 and conducting elements 515 are omitted from operations of example flow 700. In some embodiments, at least a subset of cells 401 corresponding to interconnect 310 are similarly omitted, for example as an approach to imposing one or more shape constraints on interconnect 310.

At decision blocks 723 and 724, the appropriate comparison of individual contributions generated at blocks 710 and 715 is applied to determine whether to reassign material information of the given cell 401 at block 725 or to retain material information for the given cell 401 at block 730, as described in more detail in reference to FIGS. 3A-3B. Block 730 is illustrated as two blocks, but the instruction is understood to be equivalent whether the given cell 401 forms a part of interconnect 310 or surrounding oxide.

At block 735, the modification indicated for the subset of cells 501 by blocks 721-730 are encoded into updated layout 270. As described in more detail in reference to FIG. 2, updated layout 270 can be generated by applying the one or more material reassignments to three-dimensional representation 235 to generate an updated three-dimensional representation 235 (e.g., example three-dimensional representation 575 of FIG. 5B). The updated representation can, in turn, be converted into a layout file 170 (e.g., an OASIS or GDSII format) for use in manufacturing an integrated circuit.

In some embodiments, example flow 700 includes manufacturability determinations and consequent revisions to updated layout 270 at blocks 740 and 745, respectively. As described in more detail in reference to FIG. 2, and FIGS. 3A-3B, manufacturability validation of updated layout 270 can include performing a process simulation using process data describing semiconductor manufacturing system(s) 115 that permits one or more manufacturability criteria to be assessed. For example, while a conventional Boolean design rule checker may return a false value for updated layout 270, owing at least in part to curvilinear routing, a physics-based process simulation can permit retention of function to guide manufacturability validation. In this way, manufacturability validation can include determining whether updated layout 270 represents a non-physical solution, whether updated layout 270 will function according to design once manufactured, and/or whether updated layout 270 violates any Boolean design rules that apply to rectilinear portions of updated layout 270.

In some cases, updated layout 270 can include portions that conform to rectilinear routing standards. For example, interconnect 310 can include curvilinear interfaces 311 in "x-z" and "y-z" planes and can include flat or substantially flat interfaces 311 in "x-y" planes. Similarly, interconnect 310 can be constrained by a minimum thickness in a "z" axis, such that a Boolean design rule check, which can be relatively less demanding computationally than a physics-based process simulation, can validate whether updated layout 270 is manufacturable. To that end, such minimum thickness constraints can be encoded as part of operations of example process 200. For example, modifying three-dimensional representation 235 as part of operation 211 of example process 200 can include a constraint that a minimum number of cells 401 attributed to interconnect 310 (e.g., assigned a conducting material property) are maintained in the "z" direction at all positions internal to interconnect 310 (e.g., as defined by interfaces 311).

Advantageously, operations of example process 200 and example flow 700 can be implemented for diverse combinations of input and output terminals 305, as described by terminal information 220. So-called "fan-out," "fan-in," and "fan-in-out" layouts 170 include at least one input terminal and at least one output terminal, but can include multiples of either or both.

FIG. 8 is a schematic diagram illustrating an example three-dimensional representation 835 of updated layout file 270 including a fan-out configuration, in accordance with embodiments of the present disclosure. Example three-dimensional representation 835 represents a shape-modified interconnect 310 that is reshaped in accordance with example process 200, as described in more detail in reference to FIG. 2. As illustrated a first terminal 305-1 of terminals 305 represents a single input terminal, while second terminal 305-2, third terminal 305-3, and fourth terminal 305-4 represent output terminals, as described in more detail in reference to FIGS. 3A-3B, and in particular the detailed discussion of fan-out optimization, above, including equations (39)-(42). With output terminals 305-2 through 305-3 located in different quadrants of three-dimensional representation 835, interconnect 310 assumes a tee shape, with discretized curvilinear features and non-uniform width as a function of position (r). In that respect, interconnect 310 of three-dimensional representation 835 narrows at a dividing point into multiple branches, each coupling input terminal 305-1 with a different output terminal 305-2, 305-3, or 305-4. It is also shown that interconnect 310 has a substantially uniform thickness in the "z" direction, whereas each branch has a different width in the "x" or "y" directions. In this way, the influence of different terminal information 220 describing each terminal 305 is shown as a result of different operating parameters for different terminals 305.

Figure 9:
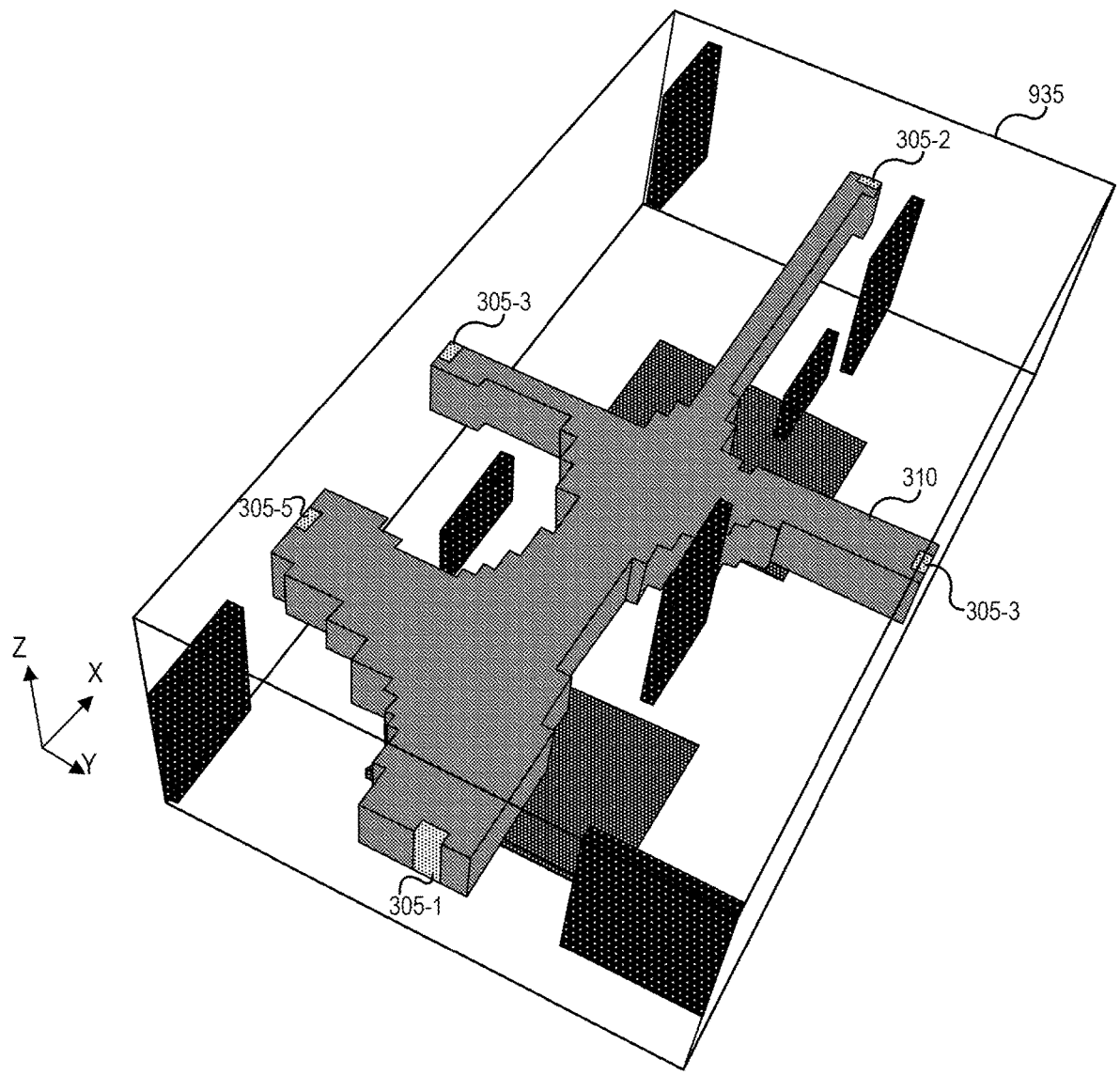
FIG. 9 is a schematic diagram illustrating an example three-dimensional representation of an updated layout file including a fan-in-out configuration, in accordance with embodiments of the present disclosure.

FIG. 9 is a schematic diagram illustrating an example three-dimensional representation 935 of updated layout file 270 including a fan-in-out configuration, in accordance with embodiments of the present disclosure. Example three-dimensional representation 935 represents a shape-modified interconnect 310 that is reshaped in accordance with example process 200, as described in more detail in reference to FIG. 2. Example three-dimensional representation 935 can be understood as a modification of Example three-dimensional representation 835, where a fifth terminal 305-5 is added, representing a second input terminal. As with first terminal 305-1, fifth terminal 305-5 is conductively coupled with output terminals 305-2, 305-3, and 305-4 via interconnect 310. As in FIG. 8, interconnect 310 branches near a dividing point substantially aligned with output terminals 305-3 and 305-4. Interconnect 310 of three-dimensional representation 935 also illustrates a wider region between the dividing point and input terminals 305-1 and 305-5 with a relative narrowing of conducting paths after dividing. In contrast to the operations described as part of fan-out optimization, fan-in optimization can proceed via segmenting layout files into multiple partial layouts to be modified by the operations of example process 200. After shape modification of partial layouts, updated layout is generated through merging partial layouts. In this way, fan-in-out modification can include parallel instances of example process 200, as well as one or more preliminary operations applied to layout file as part of discretization operation, for example.

Figure 10:
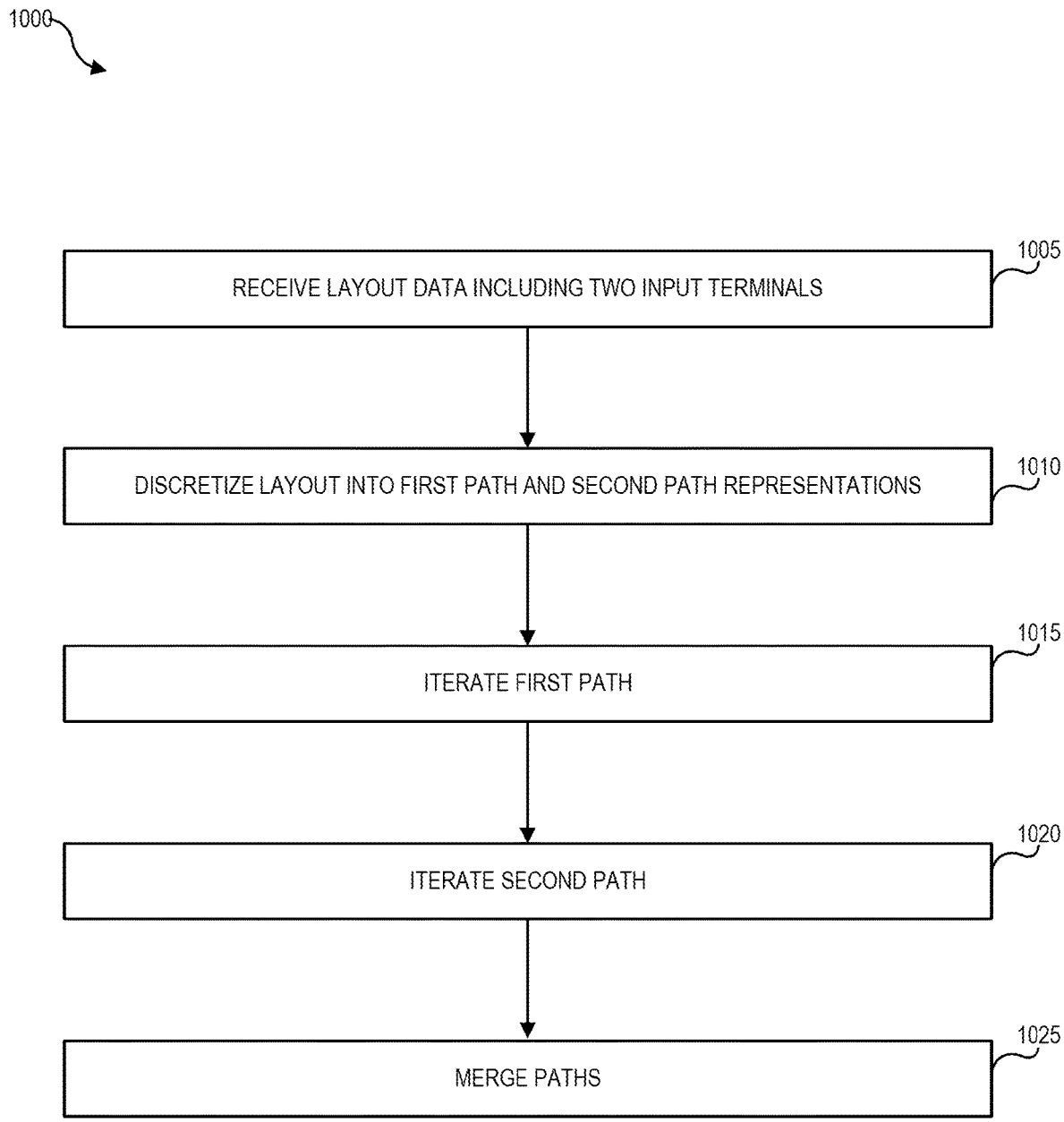
FIG. 10 is a block diagram illustrating an example flow for shape-modification of fan-in or fan-in-out layout files, in accordance with embodiments of the present disclosure.

FIG. 10 is a block diagram illustrating an example flow 1000 for shape-modification of fan-in or fan-in-out layout files 170, in accordance with embodiments of the present disclosure. As with example process 200 and example flow 800, example flow 1000 represents operations that can be implemented by a computer system (e.g., server(s) 105, client computing device(s) 110, etc.) locally and/or in a distributed manner. As such, the constituent blocks of example flow 1000 can be understood to represent machine-readable instructions encoded in software (e.g., software 155 of FIG. 1) that permit the computer system to modify the shape of interconnect 310, terminal(s) 305, etc, as part of a physics-based optimization of layout file 170 that can introduce curvilinear features to routed elements of layout file 170. While the constituent blocks of example flow 1000 are represented as proceeding in a sequence, it is understood that one or more blocks can be omitted, repeated, reordered, or sub-divided, as part of iteration of example process 200 and/or implementation on a particular computer system. For example, in the context of a distributed system, a block can be subdivided into multiple constituent processes to facilitate parallelization. In this way, two or more blocks can be executed in parallel, rather than in sequence.

At block 1005, example flow 1000 include receiving layout data 215, including terminals 305 and interconnect 310. As with example process 200, layout data 215 includes terminal information 220 and layer information 225. Terminal information 220 encodes whether terminals 305 are input terminals or output terminals. As such, block 1010 includes generating a distinct conductive path for each input terminal. For example, in example three-dimensional layout 1035 of FIG. 9, interconnect 310 couples two input terminals with three output terminals. Block 1010, therefore, includes defining a first conductive path between first input terminal 305-1 and output terminals 305-2, 305-3, and 305-5, and defining a second conductive path between second input terminal 305-5 and the output terminals. In this way, fan-in-out configurations can be modified by the operations of example process 200 by defining a number of distinct conductive paths equivalent to the number of input terminals. Advantageously, implementing example flow 1000 permits complex layout files 170 to be segmented into relatively simple configurations for parallel processing. In this way, physics-based shape modification can be applied to layout files 170 that would otherwise fail design rule-based manufacturability validation. Additionally, integrated circuit layouts often incorporate many repeated instances of basic layout elements, associated, for example, with circuit components (e.g., fin-FETs). As such, segmentation can permit layout data 215 to be used to populate a database of partial layouts indexed to layer information 225 and terminal information 220, with which performance of example system 100 can be further improved.

At block 1015, the first conductive path defined from layout data 215 is iterated using at least a subset of operations of example process 200. As described in reference to FIGS. 3A-8, one or more iterations of example process 200 can generate an updated layout 270. In the context of example flow 1000, however, iteration of first path provides a partial update to layout file 170. Concurrently, in parallel, in serial, or otherwise, block 1020 includes iterating second conductive path using at least a subset of operations of example process 200. As previously mentioned, example flow 1000 is described for a layout file 170 including two input terminals 305. To that end, blocks 1000 and 1015 can be accompanied by additional instances of example process 200 for additional conductive paths, corresponding to third input terminals 305, fourth input terminals 305, etc.

At block 1025, example flow 1000 include merging shape modified paths to generate updated three-dimensional representation 235 for the fan-in or fan-in-out configuration. In some embodiments, merging includes applying, on a cell-wise basis, a Boolean function to determine whether to assign a given cell 401 to a conducting material or a dielectric or insulating material. Examples of Boolean functions include AND, OR, INCLUSIVE OR, EXCLUSIVE OR, or the like. In an illustrative example, to avoid eliminating both portions of interconnect 310 that couple with only one of the input terminals 305, an INCLUSIVE OR function can be defined such that a cell 401 is assigned to a conducting material (e.g., a metal) if the cell 401 is assigned as a metal in either first conductive path or second conductive path.

Figure 11:
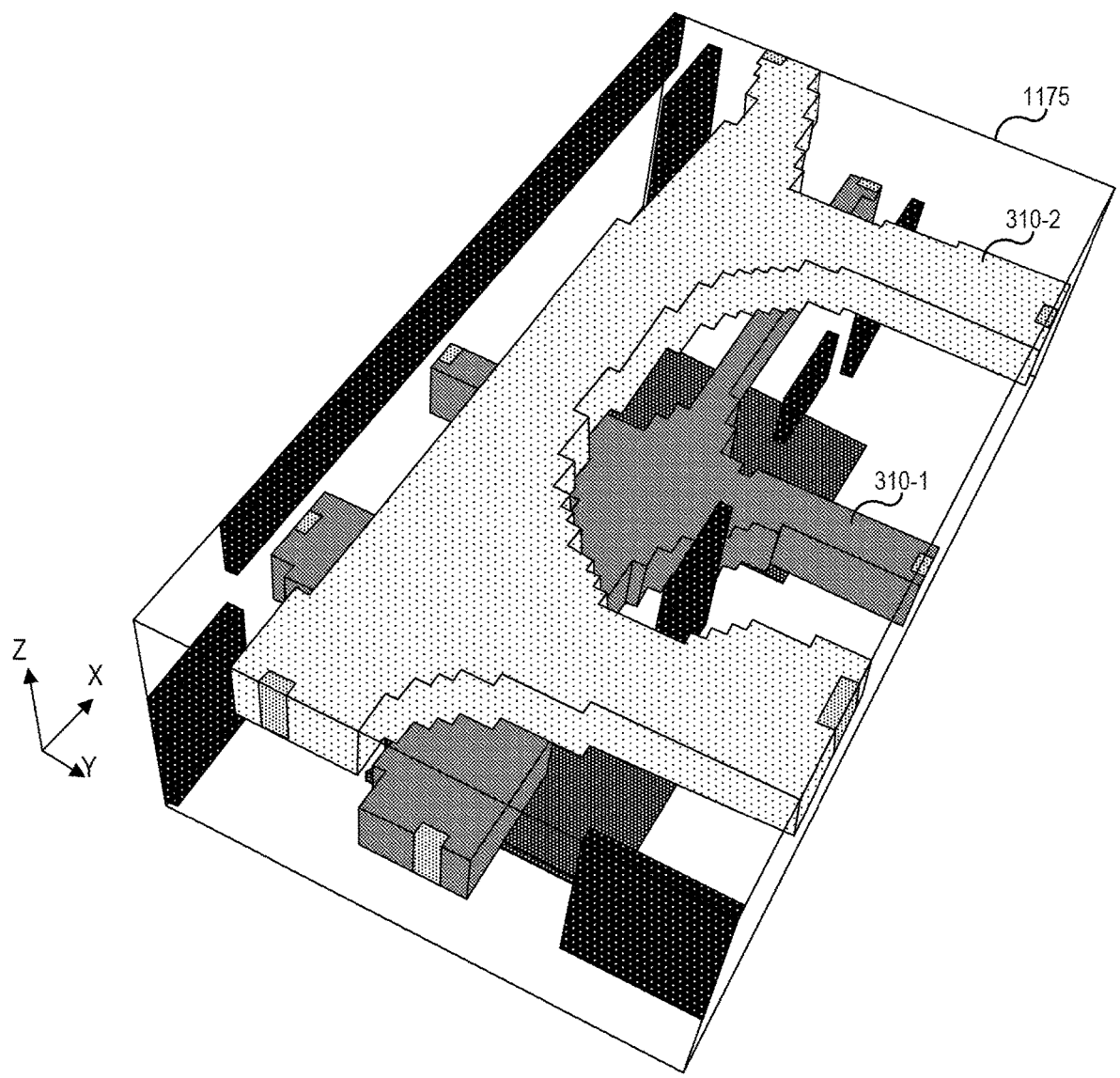
FIG. 11 is a schematic diagram illustrating an example three-dimensional representation of a multi-layer layout file including multiple interconnects coupling multiple terminals, in accordance with embodiments of the present disclosure.

FIG. 11 is a schematic diagram illustrating an example three-dimensional representation 1175 of a multi-layer layout file 170 including multiple interconnects 310 coupling multiple terminals, in accordance with embodiments of the present disclosure. Example three-dimensional representation 1175 represents an optimized layout file 170 including a first interconnect 310-1 and a second interconnect 310-2 that are reshaped in accordance with example process 200, as described in more detail in reference to FIG. 2. In the example of FIG. 11, both first interconnect 310-1 and second interconnect 310-2 are fan-in-out configured to couple multiple input terminals with multiple output terminals on two distinct "z" layers of an integrated circuit layout. For such multilayer layouts 170, example process 200 can include multiple parallel optimization processes incorporating operations of example flow 800 and example flow 1100 to subdivide optimization operations and to subsequently merge constituent elements of example three-dimensional representation 1175 into updated layout 270.

In an illustrative example, illustrated in example three-dimensional representation 1175, first interconnect 310-1 can be modified as described in more detail in reference to FIGS. 8-11. During optimization of first interconnect 310-1, second interconnect 310-2 can be held static. Subsequent convergence of first interconnect 310-1, second interconnect 310-2 can be optimized as described in more detail in reference to FIGS. 8-11 with first interconnect 310-1 held static. By iterating this process, both first interconnect 310-1 and second interconnect 310-2 can be modified to optimize respective RC values, or other optimization metrics, as described in more detail in reference to FIG. 2. Additionally or alternatively, first interconnect 310-1 and second interconnect 310-2 can be optimized in parallel, such that at each iteration of example process 200, multiple interconnects 310 are modified together. Advantageously, such an approach permits fewer iterations of example process 200.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for optimization of conducting interconnects, the method comprising:
    receiving an integrated circuit layout including a plurality of terminals and an interconnect, wherein the interconnect represents a conductive coupling between the plurality of terminals;
    receiving terminal information describing operating parameters of the plurality of terminals;
    receiving layer information describing material composition and material property information for the plurality of terminals and the interconnect;
    generating a three-dimensional representation of an integrated circuit using the integrated circuit layout and the layer information, wherein the three-dimensional representation includes a cell corresponding to a discrete volumetric element of the three-dimensional representation, the cell representing at least a portion of the interconnect or at least a portion of a non-conducting material external to the interconnect;
    determining an individual contribution of the cell to a resistance-capacitance (RC) value of the interconnect using the three-dimensional representation and the terminal information; and
    generating an updated integrated circuit layout based at least in part on the individual contribution.

2. The computer-implemented method of claim 1, wherein determining the individual contribution of the element to the RC value comprises:
    determining a generator admittance and a load admittance for the cell based at least in part on the layer information and the terminal information;
    determining an input admittance using the generator admittance and the load admittance;
    determining an admittance density for the cell using the input admittance, wherein the admittance density describes a local contribution of the cell to an admittance of the interconnect; and
    generating a differential RC value for the cell based at least in part on the admittance density.

3. The computer-implemented method of claim 1, wherein the cell is a first cell, wherein the three-dimensional representation further includes a second cell, and wherein generating the updated integrated circuit layout comprises:
    determining conductive contributions of the first cell and the second cell to a conductance of the interconnect;
    determining capacitive contributions of the first cell and the second cell to a capacitance of the interconnect;
    generating a smoothed conductive contribution and a smoothed capacitive contribution for the first cell using the respective contributions of the first cell and the second cell; and
    determining a material composition for the first cell based at least in part on the smoothed contributions for the first cell.

4. The computer-implemented method of claim 3, wherein determining the material composition comprises:
    when the cell represents a part of the interconnect, re-assigning the cell to represent the non-conducting material if the smoothed capacitive contribution for the first cell exceeds the smoothed conductive contribution of the first cell; or
    when the cell represents a part of the non-conducting material, re-assigning the cell to represent the interconnect if the smoothed conductive contribution for the first cell exceeds the smoothed capacitive contribution of the first cell.

5. The computer-implemented method of claim 4, wherein generating the smoothed contributions for the first cell comprises three-dimensional smoothing of the respective contributions of the first cell and the second cell.

6. The computer-implemented method of claim 4, wherein generating the smoothed contributions for the first cell comprises gaussian smoothing using a standard deviation parameter, $\sigma$, less than a width of the interconnect in the integrated circuit layout.

7. The computer-implemented method of claim 1, further comprising:
inputting the updated integrated circuit layout to a process model configured to output a simulated manufactured integrated circuit produced by a semiconductor manufacturing system using the updated integrated circuit layout;
generating the simulated manufactured integrated circuit as the output of the process model; and
determining a manufacturability of the updated integrated circuit layout for the semiconductor manufacturing system using the output of the process model.

8. The computer-implemented method of claim 7, wherein the manufacturability indicates that the updated integrated circuit layout is not manufacturable by the semiconductor manufacturing system, the method further comprising:
generating a revised layout using the updated integrated circuit layout and the process model, the revised layout being manufacturable by the semiconductor manufacturing system.

9. The computer-implemented method of claim 1, wherein the plurality of terminals comprises an input terminal and two output terminals.

10. The computer-implemented method of claim 1, wherein the plurality of terminals comprises a plurality of input terminals and at least one output terminal, wherein the three-dimensional representation is a first representation, and wherein the method further comprises:
generating the first representation corresponding to when a first input terminal included in the input terminals is active and remaining input terminals are inactive;
generating a second representation using the integrated circuit layout and the layer information, the second representation corresponding to when a second input terminal included in the input terminals is active and remaining input terminals are inactive, and wherein both the first representation and the second representation include the cell;
generating a first partial update using the first representation;
generating a second partial update using the second representation; and
generating the updated integrated circuit layout using the first partial update and the second partial update.

11. The computer-implemented method of claim 10, wherein generating the updated integrated circuit layout comprises merging the first partial update and the second partial update using an inclusive OR operator.

12. The computer-implemented method of claim 1, further comprising outputting the updated integrated circuit layout, the outputting comprising:
generating an updated integrated circuit layout file using the updated integrated circuit layout; and
storing the updated integrated circuit layout file in a data store.

13. A non-transitory computer readable memory device storing machine-executable instructions that, when executed by a machine, cause the machine to perform operations comprising:
receiving an integrated circuit layout including a plurality of terminals and an interconnect, wherein the interconnect represents a conductive coupling between the plurality of terminals;
receiving terminal information describing operating parameters of the plurality of terminals;
receiving layer information describing material composition and material property information for the plurality of terminals and the interconnect;
generating a three-dimensional representation of an integrated circuit using the integrated circuit layout and the layer information, wherein the three-dimensional representation includes a cell corresponding to a discrete volumetric element of the three-dimensional representation, the cell representing at least a portion of the interconnect or at least a portion of a non-conducting material external to the interconnect;
determining an individual contribution of the cell to a resistance-capacitance (RC) value of the interconnect using the three-dimensional representation and the terminal information; and
generating an updated integrated circuit layout based at least in part on the individual contribution.

14. The non-transitory computer readable memory device of claim 13, wherein determining the individual contribution of the element to the RC value comprises:
determining a generator admittance and a load admittance for the cell based at least in part on the layer information and the terminal information;
determining an input admittance using the generator admittance and the load admittance;
determining an admittance density for the cell using the input admittance, wherein the admittance density describes a local contribution of the cell to an admittance of the interconnect; and
generating a differential RC value for the cell based at least in part on the admittance density.

15. The non-transitory computer readable memory device of claim 13, wherein the three-dimensional representation further includes a second cell, and wherein generating the updated integrated circuit layout comprises:
determining conductive contributions of the first cell and the second cell to a conductance of the interconnect;
determining capacitive contributions of the first cell and the second cell to a capacitance of the interconnect;
generating a smoothed conductive contribution and a smoothed capacitive contribution for the first cell using the respective contributions of the first cell and the second cell; and
determining a material composition for the first cell based at least in part on the smoothed contributions for the first cell.

16. The non-transitory computer readable memory device of claim 15, wherein determining the material composition comprises:
when the cell represents a part of the interconnect, re-assigning the cell to represent the non-conducting material if the smoothed capacitive contribution for the first cell exceeds the smoothed conductive contribution of the first cell; or
when the cell represents a part of the non-conducting material, re-assigning the cell to represent the interconnect if the smoothed conductive contribution for the first cell exceeds the smoothed capacitive contribution of the first cell.

17. The non-transitory computer readable memory device of claim 13, wherein generating the smoothed contributions for the first cell comprises gaussian smoothing using a standard deviation parameter, $\sigma$, less than an initial width of the interconnect in the integrated circuit layout.

18. The non-transitory computer readable memory device of claim 13, wherein the instructions, when executed by the machine, cause the machine to perform further operations comprising:
- inputting the updated integrated circuit layout to a process model configured to output a simulated manufactured integrated circuit produced by a semiconductor manufacturing system using the updated integrated circuit layout;
- generating the simulated manufactured integrated circuit as the output of the process model; and
- determining a manufacturability of the updated integrated circuit layout for the semiconductor manufacturing system based at least in part on the output of the process model.

19. The non-transitory computer readable memory device of claim 18, wherein the manufacturability indicates that the updated integrated circuit layout is not manufacturable by the semiconductor manufacturing system, and wherein the instructions, when executed by the machine, cause the machine to perform further operations comprising:
- generating a revised layout based at least in part on the updated integrated circuit layout and the process model, the revised layout being manufacturable by the semiconductor manufacturing system.

20. The non-transitory computer readable memory device of claim 13, wherein the plurality of terminals comprises a plurality of input terminals and at least one output terminal, wherein the three-dimensional representation is a first representation, and wherein the instructions, when executed by the machine, cause the machine to perform further operations comprising:
- generating the first representation corresponding to when a first input terminal included in the input terminals is active and remaining input terminals are inactive;
- generating a second representation using the integrated circuit layout and the layer information, the second representation corresponding to when a second input terminal included in the input terminals is active and remaining input terminals are inactive, and wherein both the first representation and the second representation include the cell;
- generating a first partial update using the first representation;
- generating a second partial update using the second representation; and
- generating the updated integrated circuit layout using the first partial update and the second partial update.

* * * * *